United States Patent
Yamaura et al.

(10) Patent No.: US 10,165,435 B2
(45) Date of Patent: Dec. 25, 2018

(54) INFORMATION PROCESSING DEVICE, COMMUNICATION SYSTEM, INFORMATION PROCESSING METHOD, AND PROGRAM

(71) Applicant: SONY CORPORATION, Tokyo (JP)

(72) Inventors: Tomoya Yamaura, Tokyo (JP); Takeshi Itagaki, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/517,859

(22) PCT Filed: Aug. 20, 2015

(86) PCT No.: PCT/JP2015/073293
§ 371 (c)(1),
(2) Date: Apr. 7, 2017

(87) PCT Pub. No.: WO2016/059868
PCT Pub. Date: Apr. 21, 2016

(65) Prior Publication Data
US 2017/0311143 A1 Oct. 26, 2017

(30) Foreign Application Priority Data
Oct. 16, 2014 (JP) .................. 2014-211306

(51) Int. Cl.
*H04W 4/00* (2018.01)
*H04W 8/00* (2009.01)
(Continued)

(52) U.S. Cl.
CPC ............. *H04W 8/005* (2013.01); *H04W 8/00* (2013.01); *H04W 72/08* (2013.01); *H04W 76/14* (2018.02); *H04W 84/12* (2013.01); *H04W 92/18* (2013.01)

(58) Field of Classification Search
CPC ....... H04W 64/00; H04W 24/10; H04W 4/02; H04W 4/023; H04W 4/027; H04W 4/08; H04W 84/08; H04M 2242/30
(Continued)

(56) References Cited

U.S. PATENT DOCUMENTS 9,679,491 B2 *  6/2017  Canoy .................. G09B 5/00
9,763,151 B2 *  9/2017  Kim .................... H04W 36/04
(Continued)

FOREIGN PATENT DOCUMENTS

JP    2005-323150 A    11/2005
JP    2007-134905 A     5/2007
(Continued)

OTHER PUBLICATIONS

International Search Report dated Sep. 29, 2015 in PCT/JP2015/073293 filed Aug. 20, 2015.
(Continued)

*Primary Examiner* — Joseph Arevalo
(74) *Attorney, Agent, or Firm* — Xsensus, LLP

(57) ABSTRACT

To efficiently use a wireless communication resource. An information processing device includes a communication unit and a control unit. The communication unit transmits a device discovery request signal for performing direct inter-device wireless communication. The control unit changes a detection threshold for detecting a wireless communication signal at timing after transmission of the device discovery request signal. Further, when predetermined information is included when the device discovery request signal for performing direct-inter-device wireless communication is received from another information processing device, the control unit transmits a device discovery response signal to
(Continued)

the another information processing device, based on the predetermined information included in the device discovery request signal.

13 Claims, 20 Drawing Sheets

(51) Int. Cl.
  *H04W 72/08* (2009.01)
  *H04W 84/12* (2009.01)
  *H04W 92/18* (2009.01)
  *H04W 76/14* (2018.01)
(58) Field of Classification Search
  USPC ........ 455/450, 434, 426.1, 435.1, 41.2, 11.1, 455/422, 410, 456.1, 517, 509, 435.2, 455/552.1, 422.1
  See application file for complete search history.

(56) References Cited

U.S. PATENT DOCUMENTS

| | | | |
|---|---|---|---|
| 2009/0240381 A1* | 9/2009 | Lane | H02J 3/14 700/296 |
| 2010/0150016 A1 | 6/2010 | Barr | |
| 2011/0258313 A1 | 10/2011 | Mallik et al. | |
| 2012/0120316 A1* | 5/2012 | Lee | H04N 21/42204 348/564 |
| 2012/0184286 A1* | 7/2012 | Richardson | G01S 5/0236 455/456.1 |
| 2012/0195296 A1 | 8/2012 | Adachi et al. | |
| 2012/0315853 A1 | 12/2012 | Lambert | |
| 2013/0166759 A1 | 6/2013 | Rajamani et al. | |

FOREIGN PATENT DOCUMENTS

| | | |
|---|---|---|
| JP | 2007-329570 A | 12/2007 |
| JP | 2010-226584 A | 10/2010 |
| JP | 2010-258852 A | 11/2010 |
| JP | 2012/160895 A | 8/2012 |
| JP | 2012-160895 A | 8/2012 |
| JP | 2014/195160 A | 10/2014 |
| JP | 2014-195160 A | 10/2014 |
| JP | 2015-503859 A | 2/2015 |
| WO | WO 2012/111261 A1 | 8/2012 |
| WO | WO 2013/073915 A1 | 5/2013 |
| WO | 2013/096678 A2 | 6/2013 |

OTHER PUBLICATIONS

Office Action dated Mar. 20, 2018 in corresponding Japanese Patent Application No. 2014-211306 (with English Translation), 14 pages.
Extended European Search Report dated Mar. 15, 2018in corresponding European Patent Application No. 15851605.4, 15 pages.
Michael Montemurro, "TDLS Peer Discovery", doc.: IEEE 802.11-09/1218r7, IEEE P802.11 Wireless LANs; vol. 802.11z, No. 7, XP017678040, Jan. 2010, pp. 1-12.
Office Action issued in Japanese Application 2014-211306 dated Sep. 25, 2018.

\* cited by examiner

FIG. 14

| Order | Information | Length (byte) | Content |
|---|---|---|---|
| 1 | Category | 1 | The Category field is set to 12 (the value for TDLS). |
| 2 | Action | 1 | The Action field is set to 10, representing TDLS Discovery Request. |
| 3 | Dialog Token | 1 | The Dialog Token can be used to match TDLS Discovery Response frames to the corresponding TDLS Discovery Request frame. |
| 4 | Link Identifier | 20 | The Link Identifier element structured as below.<br>Element ID: 1 byte, set to 101.<br>Length : 1 byte (set to 18)<br>BSSID : 6 byte<br>TDLS Initiator STA Address : 6 byte<br>TDLS Responder STA Address : 6 byte |
| 5 | TDLS Discovery Control | 5 | Element ID: 1 byte (SET CURRENTLY reserved VALUE (222, FOR EXAMPLE))<br>Length: 1 byte (SET 3)<br>PACKET DETECTION THRESHOLD USED IN RECEIVING TDLS Discovery Response frame: 1 byte<br>TIME LENGTH TO WAIT FOR DETECTION OF TDLS Discovery Response frame: 1 byte<br>ACK Control: 1 byte |

FIG. 15

| Order | Information | Length (byte) | Content |
|---|---|---|---|
| 1 | Category | 1 | The Category field is set to 12 (the value for TDLS). |
| 2 | Action | 1 | The Action field is set to 10, representing TDLS Discovery Request. |
| 3 | Dialog Token | 1 | The Dialog Token can be used to match TDLS Discovery Response frames to the corresponding TDLS Discovery Request frame. |
| 4 | Link Identifier | 20 | The Link Identifier element structured as below.<br>Element ID: 1 byte, set to 101.<br>Length : 1 byte (set to 18)<br>BSSID : 6 byte<br>TDLS Initiator STA Address : 6 byte<br>TDLS Responder STA Address : 6 byte |
| 5 | TDLS Discovery Control | 6 | Element ID: 1 byte (SET CURRENTLY reserved VALUE (222, FOR EXAMPLE))<br>Length: 1 byte (SET 4)<br>PACKET DETECTION THRESHOLD USED IN RECEIVING TDLS Discovery Response frame: 1 byte<br>TIME LENGTH TO WAIT FOR DETECTION OF TDLS Discovery Response frame: 1 byte<br>ACK Control: 1 byte<br>Preamble pattern: 1 byte |

INFORMATION PROCESSING DEVICE, COMMUNICATION SYSTEM, INFORMATION PROCESSING METHOD, AND PROGRAM

CROSS REFERENCE TO RELATED APPLICATIONS

This application claims the benefit of Japanese Priority Patent Application JP 2014-211306 filed on Oct. 16, 2014, the entire contents of which are incorporated herein by reference.

TECHNICAL FIELD

The present technology relates to an information processing device. To be specific, the present technology relates to an information processing device that exchanges information, using wireless communication, a communication system, an information processing method, and a program for causing a computer to execute the method.

BACKGROUND ART

In the related art, wireless communication technologies that exchange information, using wireless communication, exist. For example, information processing devices (wireless communication devices) close to each other can exchange information, using wireless communication. However, when a plurality of information processing devices transmits data, using the same wireless resources (the same frequency and time), data collide and interfere with each other, and a reception side may fail in data reception. Therefore, when a plurality of information processing devices using the same frequency exists, avoidance of collision of data is important.

Therefore, for example, a technology that avoids the collision, using a carrier sense, has been proposed. For example, a technology that avoids the collision of data, by measuring reception power in a frequency channel to be used, performing threshold (carrier sense level) determination of the measured reception power, and suppressing transmission until confirming a free capacity of the wireless resources, has been proposed.

Further, for example, a technology that efficiently performs a media access, by temporarily changing the carrier sense level, has been proposed (for example, see Patent Literature 1).

CITATION LIST

Patent Literature

[PTL 1]
JP 2007-134905 A

SUMMARY

Technical Problem

The above-described related art can efficiently perform the media access, by changing the carrier sense level.

Here, for example, assume a case in which the distance between two information processing devices that perform data communication is relatively separated. In this case, for example, indirect wireless communication through another information processing device may more efficiently use the wireless communication resource than direct inter-device communication between the two information processing devices. Therefore, efficient use of the wireless communication resource in consideration of the positions of the information processing devices and a use state is important.

The present technology has been made in view of the foregoing, and the present technology efficiently uses a wireless communication resource.

Solution to Problem

According to an embodiment of the present technology, a first aspect of the present technology is an information processing device that includes a communication unit configured to transmit a device discovery request signal for performing direct inter-device wireless communication, and a control unit configured to change a detection threshold for detecting a wireless communication signal at timing after transmission of the device discovery request signal, and an information processing method, and a program for causing a computer to execute the method. Accordingly, the present technology has a function to change the detection threshold at timing after transmission of the device discovery request signal.

Further, in the first aspect, the control unit may set a first threshold, as the detection threshold, when the control unit waits for detection of the wireless communication signal transmitted from a first information processing device connected when wireless communication is indirectly performed between the information processing device and another information processing device, and set a second threshold different from the first threshold at timing after transmission of the device discovery request signal for discovering a second information processing device capable of performing direct wireless communication with the information processing device. Accordingly, the present technology has functions to set the first threshold when waiting for detection of the wireless communication signal transmitted from the first information processing device, and to set the second threshold at timing after transmission of the device discovery request signal for discovering the second information processing device.

Further, in the first aspect, the control unit may wait for detection of a device discovery response signal transmitted from the second information processing device for a predetermined time after the control unit sets the second threshold, and set the first threshold after an elapse of the predetermined time. Accordingly, the present technology has functions to wait for detection of the device discovery response signal transmitted from the second information processing device for a predetermined time after setting the second threshold, and to set the first threshold after an elapse of a predetermined time.

Further, in the first aspect, the control unit may use an Institute of Electrical and Electronic Engineers (IEEE) 802.11 specification, as a protocol of the wireless communication, and use tunneled direct link setup (TDLS), as a protocol that performs the direct wireless communication with the second information processing device, the device discovery request signal may be a TDLS Discovery Request frame, and the device discovery response signal may be a TDLS Discovery Response frame. Accordingly, the present technology has functions to use the IEEE 802.11 specification as the protocol of the wireless communication, to use the TDLS as the protocol that performs the direct wireless communication with the second information processing device, to transmit the TDLS Discovery Request frame, as the device discovery request signal, and to transmit the TDLS Discovery Response frame as the device discovery response signal.

Further, in the first aspect, the control unit may set the second threshold obtained based on reception power of a case where the wireless communication using a data rate usable in the wireless communication between the information processing device and the first information processing device, or a data rate obtained based on the data rate is performed. Accordingly, the present technology has a function to set the second threshold obtained based in the reception power of a case of performing the wireless communication using the data rate that can be used in the wireless communication between the information processing device and the first information processing device, or the data rate obtained based on the aforementioned data rate.

Further, in the first aspect, the control unit may notify the first information processing device that the information processing device does not receive the wireless communication signal, while the second threshold is being set, when the control unit has set a value larger than the first threshold, as the second threshold. Accordingly, the present technology has a function to notify the first information processing device that the information processing device does not receive the wireless communication signal while the second threshold is being set, when having set the value larger than the first threshold, as the second threshold.

Further, in the first aspect, the control unit may set a smaller value of the first threshold and the second threshold, as the detection threshold, while a direct wireless communication link is being established between the information processing device and the second information device, after reception of the device discovery response signal from the second information processing device, and set the first threshold, as the detection threshold, at timing of cutting of the direct wireless communication link between the information processing device and the second information processing device. Accordingly, the present technology has functions to set a smaller value of the first and second thresholds, as the detection threshold, while the direct wireless communication link is being established between the information processing device and the second information processing device, after reception of the device discovery response signal from the second information processing device, and to set the first threshold at timing of cutting of the direct wireless communication link between the information processing device and the second information processing device.

Further, in the first aspect, the control unit may perform transmission power control for performing transmission to the second information processing device within a range in which communication quality between the information processing device and the second information processing device is maintainable, and perform transmission power control for performing transmission to the first information processing device within a range in which communication quality between the information processing device and the first information processing device is maintainable, when the control unit has set a smaller value of the first threshold and the second threshold, as the detection threshold, while the direct wireless communication link is being established between the information processing device and the second information processing device. Accordingly, the present technology has functions to perform transmission power control for performing transmission to the second information processing device within a range in which communication quality between the information processing device and the second information processing device can be maintained, and to perform transmission power control for performing transmission to the first information processing device within a range in which communication quality between the information processing device and the first information processing device can be maintained, while the direct wireless communication link is being established between the information processing device and the second information processing device, and when the smaller value of the first and second thresholds is set.

Further, in the first aspect, the control unit may transmit the device discovery request signal, including, in the device discovery request signal, at least one of information related to reception power used when the control unit obtains the second threshold, information that specifies a type of a physical layer (PHY) preamble to be used in the device discovery response signal, information related to a time band to wait for detection of the device discovery response signal after transmission of the device discovery request signal, and information that specifies use of a signal of not performing reception confirmation when the second information processing device transmits the device discovery response signal. Accordingly, the present technology has a function to transmit the device discovery request signal, including at least one of the aforementioned information in the device discovery request signal.

Further, in the first aspect, the control unit may include information that specifies a PHY preamble receivable with lowest reception power in the direct wireless communication between the information processing device and the second information processing device, when the control unit transmits the device discovery request signal, including the information that specifies a type of a PHY preamble. Accordingly, the present technology has a function to include the information that specifies a PHY preamble that can be received with lowest reception power in the direct wireless communication between the information processing device and the second information processing device, when transmitting the device discovery request signal, including the information that specifies a type of a PHY preamble.

Further, in the first aspect, the control unit may transmit the device discovery request signal in a first time and a frequency slot allocated to direct wireless communication with a second information processing device, based on wireless communication resource allocation information notified from a first information processing device, and wait for detection of a device discovery response signal in a second time and a frequency slot arranged temporally after the first time and the frequency slot, of the wireless communication resource allocation information. Accordingly, the present technology has functions to transmit the device discovery request signal in the first time and the frequency slot allocated to the direct wireless communication with the second information processing device, based on the wireless communication resource allocation information notified from the first information processing device, and to wait for detection of the device discovery response signal in the second time and the frequency slot arranged temporally after the first time and the frequency slot, of the wireless communication resource allocation information.

Further, in the first aspect, the information processing device may be an information processing device capable of performing the direct wireless communication with a second information processing device, in a state of maintaining wireless communication with a first information processing device. Accordingly, the present technology has a function to perform the direct wireless communication with the second information processing device, in a state of maintaining the wireless communication with the first information processing device.

Further, a second aspect of the present technology is an information processing device, an information processing method thereof, and a program for causing a computer to execute the method, the information processing device including a control unit configured to transmit, when the control unit has received a device discovery request signal for performing direct inter-device wireless communication from another information processing device, and when at least one of information below is included in the device discovery request signal, the control unit configured to transmit a device discovery response signal to the another information processing device, based on the information included in the device discovery request signal, the information being information related to reception power used when the control unit obtains a detection threshold to be used when the another information processing device detects the device discovery response signal, information that specifies a type of a PHY preamble to be used in the device discovery response signal, information related to a time band to wait for detection of the device discovery response signal after the information processing device transmits the device discovery request signal, and information that specifies use of a signal of not performing reception confirmation when the another information processing device transmits the device discovery response signal. Accordingly, the present technology has a function to transmit the device discovery response signal to the another information processing device, based on the information, when at least one of the aforementioned information is included when having received the device discovery request signal from the another information processing device.

Further, in the second aspect, the control unit may use an IEEE 802.11 specification, as a protocol of the wireless communication, and use TDLS, as a protocol that performs the direct wireless communication with the another information processing device, the device discovery request signal may be a TDLS Discovery Request frame, and the device discovery response signal may be a TDLS Discovery Response frame. Accordingly, the present technology has functions to use the IEEE 802.11 specification, as the protocol of the wireless communication, to use the TDLS, as the protocol that performs the direct wireless communication with the another information processing device, to transmit the TDLS Discovery Request frame, as the device discovery request signal, and to transmit the TDLS Discovery Response frame, as the device discovery response signal.

Further, in the second aspect, when the device discovery request signal includes the information related to reception power used when the control unit obtains a detection threshold to be used when the another information processing device detects the device discovery response signal, but does not include the information that specifies a type of a PHY preamble to be used in the device discovery response signal, the control unit may transmit the device discovery response signal, using one of a plurality of PHY preambles usable in the wireless communication, based on the information related to reception power used when the control unit obtains a detection threshold to be used when the another information processing device detects the device discovery response signal. Accordingly, the present technology has a function to transmit, when the device discovery request signal includes the information related to reception power used when obtaining a detection threshold to be used when the another information processing device detects the device discovery response signal, but does not include the information that specifies a type of a PHY preamble to be used in the device discovery response signal, the function to transmit the device discovery response signal, using one of a plurality of PHY preambles usable in the wireless communication, based on the information related to reception power.

Further, a third aspect of the present technology is a communication system, an information processing method thereof, and a computer for causing a computer to execute the method, the communication system including a first information processing device including a control unit configured to set a first threshold, as a detection threshold for detecting a wireless communication signal, when the control unit waits for detection of the wireless communication signal transmitted from an access point connected when wireless communication is indirectly performed between the first information processing device and another information processing device, to set a second threshold different from the first threshold, as the detection threshold, at timing after transmission of a device discovery request signal for discovering a second information processing device capable of performing direct wireless communication with the first information processing device, and to transmit the device discovery request signal, including, in the device discovery request signal, at least one of information related to reception power used when the control unit obtains the second threshold, information that specifies a type of a PHY preamble to be used in a device discovery response signal corresponding to the device discovery request signal, information related to a time band to wait for detection of the device discovery response signal after transmission of the device discovery request signal, and information that specifies use of a signal of not performing reception confirmation when the second information processing device transmits the device discovery response signal, and a second information processing device including a control unit configured to transmit the device discovery response signal to the first information processing device, based on the information included in the device discovery request signal, when the second information processing device has received the device discovery request signal from the first information processing device. Accordingly the first information processing device has functions to set the first threshold when waiting for detection of the wireless communication signal transmitted from the access point, to set the second threshold at timing after transmission of the device discovery request signal for discovering the second information processing device, and to transmit the device discovery request signal, including at least one of the aforementioned information, and the second information processing device has a function to transmit the device discovery response signal to the first information processing device, based on the information included in the device discovery request signal, when having received the device discovery request signal from the first information processing device.

Advantageous Effects of Invention

According to an embodiment of the present technology, an excellent effect to efficiently use a wireless communication resource can be exhibited. Note that the effects described here are not necessarily limited, and any of the effects described in the present disclosure may be exhibited.

BRIEF DESCRIPTION OF DRAWINGS

FIG. 14 is a diagram illustrating a configuration example of TDLS Discovery Request Action field exchanged among the devices in the fourth embodiment of the present technology.

FIG. 15 is a diagram illustrating a configuration example of TDLS Discovery Request Action field in the fifth embodiment of the present technology.

DESCRIPTION OF EMBODIMENTS

Hereinafter, embodiments for implementing the present technology (hereinafter, referred to as embodiments) will be described. Description will be given in the following order:
1. First Embodiment (an example of changing a packet detection threshold at timing after transmission of a device discovery request packet)
2. Second Embodiment (an example in which an access point accumulates data addressed to an information processing device, a packet detection threshold of which has been changed)
3. Third Embodiment (an example in which an information processing device appropriately receives a packet from an access point during TDLS communication)
4. Fourth Embodiment (an example of avoiding re-sending of a TDLS Discovery Response frame)
5. Fifth Embodiment (an example of using a PHY preamble, selecting from a plurality of PHY preambles, in transmitting a device discovery response packet)
6. Sixth Embodiment (an example of performing wireless communication, using D2D defined in 3GPP)
7. Application Example

1. First Embodiment

[Configuration Example of Communication System]

Figure 1:
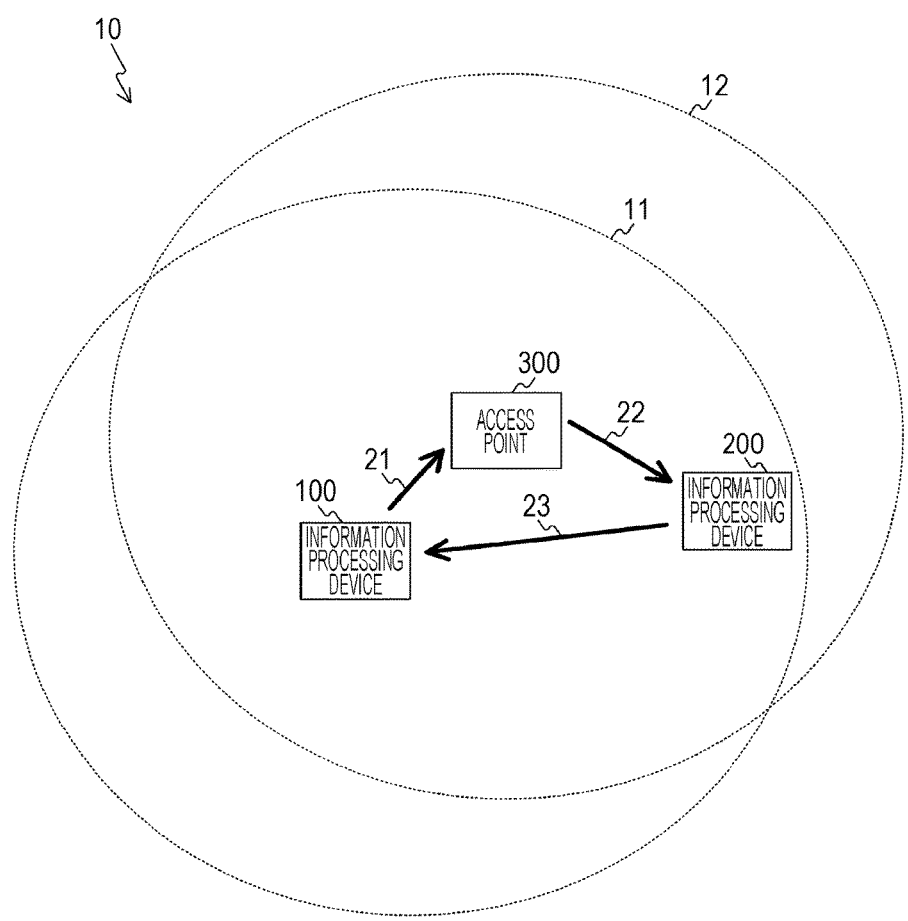
FIG. 1 is a diagram illustrating a system configuration example of a communication system 10 in a first embodiment of the present technology.

FIG. 1 is a diagram illustrating a system configuration example of a communication system 10 in a first embodiment of the present technology.

The communication system 10 includes an information processing device 100, an information processing device 200, and an access point 300

The information processing devices 100 and 200 are mobile information processing devices having a wireless communication function, for example. Here, the mobile information processing device is an information processing device such as a smart phone, a mobile phone, or a tablet terminal. Further, the information processing devices 100 and 200 have a communication function complying with a wireless local area network (LAN) standard of Institute of Electrical and Electronic Engineers (IEEE) 802.11. As the wireless LAN, for example, wireless fidelity (Wi-Fi), Wi-Fi Direct, or Wi-Fi CERTIFIED Miracast specification (technical specification name: Wi-Fi Display) can be used. Further, wireless communication using another communication system may be performed.

Here, in the IEEE 802.11 specification, tunneled direct link setup (TDLS) that enables direct data communication between child devices (wireless child devices or wireless child stations) without involving a parent device (wireless parent device or wireless parent station) is defined. In the TDLS, as frames used in a protocol for discovering a child device to be directly connected, a device discovery request packet (device discovery request signal) and a device discovery response packet (device discovery response signal) are included. To be specific, the device discovery request packet is a TDLS Discovery Request frame. Further, the device discovery response packet is a TDLS Discovery Response frame (for example, see IEEE 802.11-2012).

In FIG. 1, a case in which the access point 300 is the parent device, and the information processing devices 100 and 200 are the child devices corresponding to the TDLS will be described. For example, assume a case in which the information processing device 100 transmits the TDLS Discovery Request frame to the information processing device 200 through the access point 300 (21, 22). In this case, the information processing device 100 encapsulates necessary fields in a Data frame, and transmits the encapsulated Data frame. For example, the information processing device 100 specifies a reception address and a destination address. To be specific, the information processing device 100 specifies a basic service set identifier (BSSID) of the associated access point 300, as the reception address. Further, the information processing device 100 specifies a media access control (MAC) address of the information processing device 200, as the destination address. Further, the information processing device 100 encapsulates the fields in the Data frame, and transmits the encapsulated Data frame to the access point 300.

Figure 12:
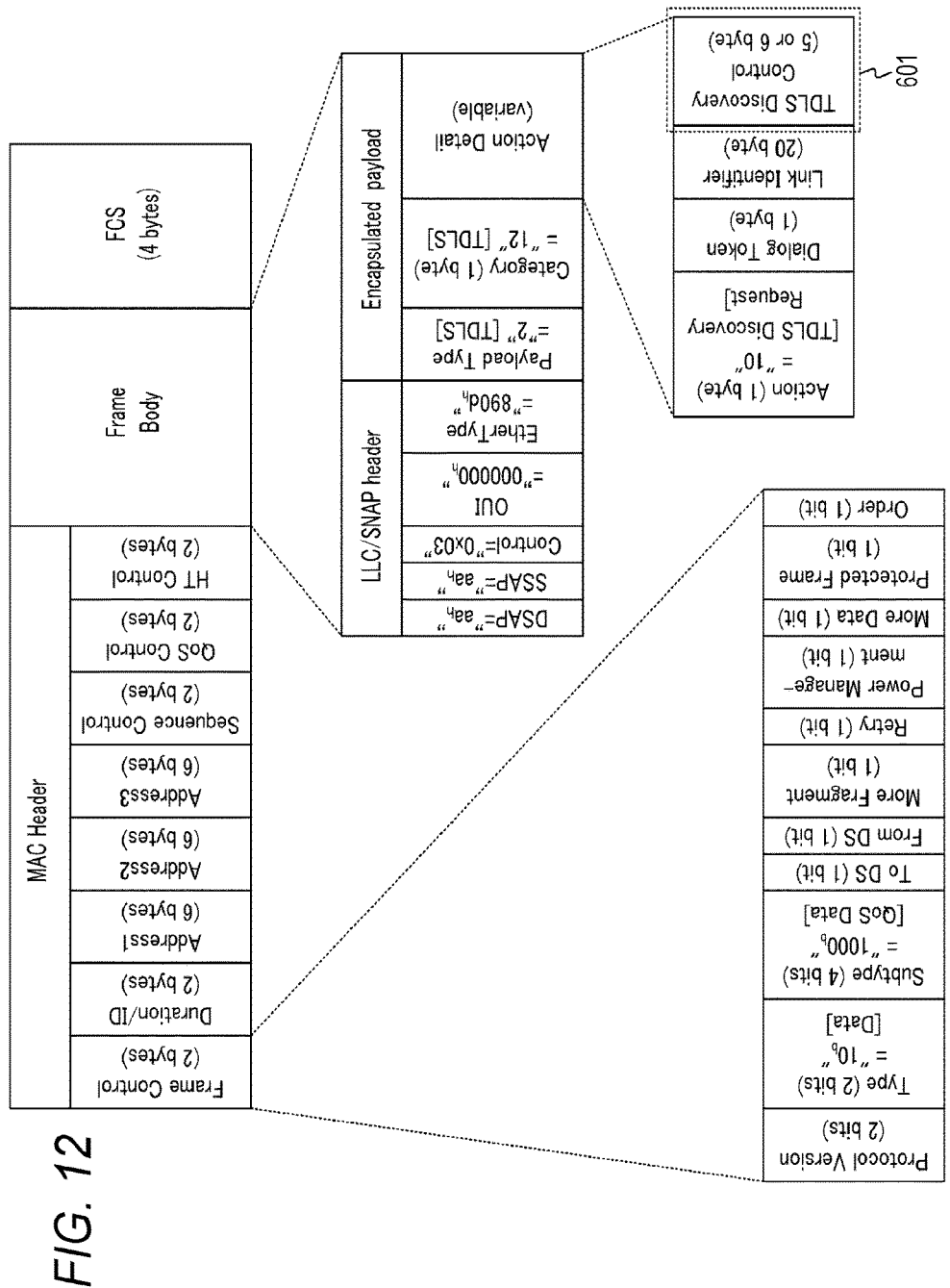
FIG. 12 is a diagram illustrating a configuration example of a frame exchanged among the devices in the fourth embodiment of the present technology.
Figure 13:
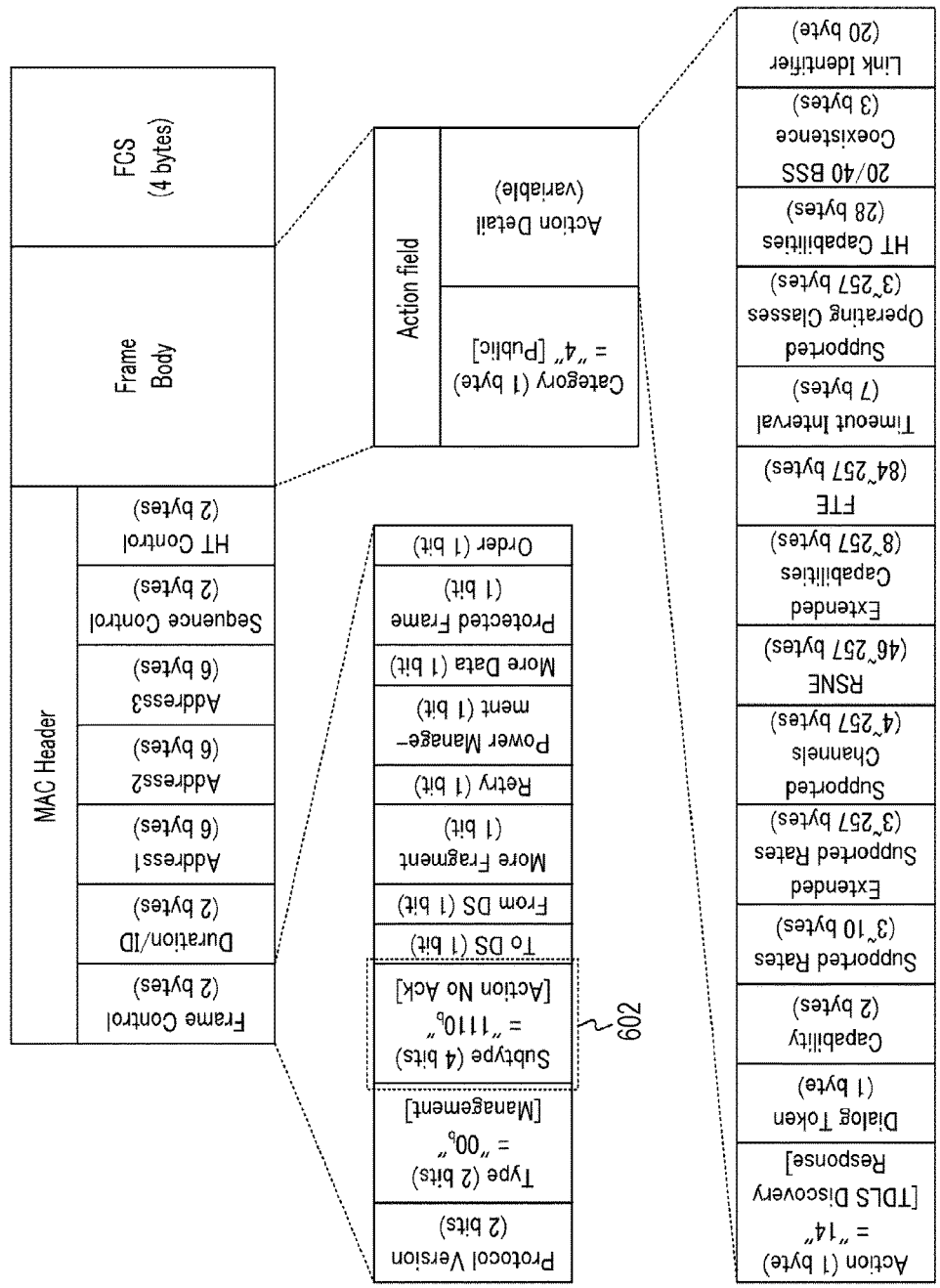
FIG. 13 is a diagram illustrating a configuration example of a frame exchanged among the devices in the fourth embodiment of the present technology.

Note that a configuration example of the TDLS Discovery Request frame is illustrated in FIGS. 12 to 14. That is, information illustrated in orders "1" to "5" of FIG. 14 is encapsulated in the Data frame and is transmitted by being included in the TDLS Discovery Request frame.

When the information processing device 200 has received the TDLS Discovery Request frame (22), the information processing device 200 directly transmits the TDLS Discovery Response frame to the information processing device 100 (23). That is, the information processing device 200 transmits the TDLS Discovery Response frame to the information processing device 100 without the access point 300 (23).

Further, the information processing device 100 can perform direct wireless communication with the information processing device 200, in a state of maintaining wireless communication with the access point 300.

Here, as illustrated in FIG. 1, assume a case in which a distance between the information processing device 100 and the information processing device 200 is relatively separated. In this case, even when the information processing device 100 receives the TDLS Discovery Response frame and determines that direct inter-device communication is available, a data rate of the wireless communication with the information processing device 200 may not be necessarily made high. For example, in a case where a distance between the information processing device 100 and the access point 300 is relatively close, the data rate of the wireless communication may not be necessarily made higher than a case where the data communication with the information processing device 200 is performed by the information processing device 100 through the access point 300. Similarly, for example, in a case where a distance between the information processing device 200 and the access point 300 is relatively close, the data rate of the wireless communication may not be necessarily made higher than a case where the data communication with the information processing device 100 by the information processing device 200 through the access point 300. As described above, when the data rate of the wireless communication may not be made high, the wireless communication resource may not be able to be optimally used.

In such a case, the efficiency may not be enhanced with the direct communication between devices using the TDLS. Further, a packet switching sequence that performs Link Setup of the TDLS is executed, and the wireless communication resource may be wasted. For example, when connection to cutting of the TDLS is performed between the information processing device 100 and the information processing device 200, TDLS direct-link establishment and TDLS direct-link cutting may be waited.

Therefore, the embodiments of the present technology describe examples of communication systems that can efficiently use the wireless communication resource.

[Configuration Example of Information Processing Device]

Figure 2:
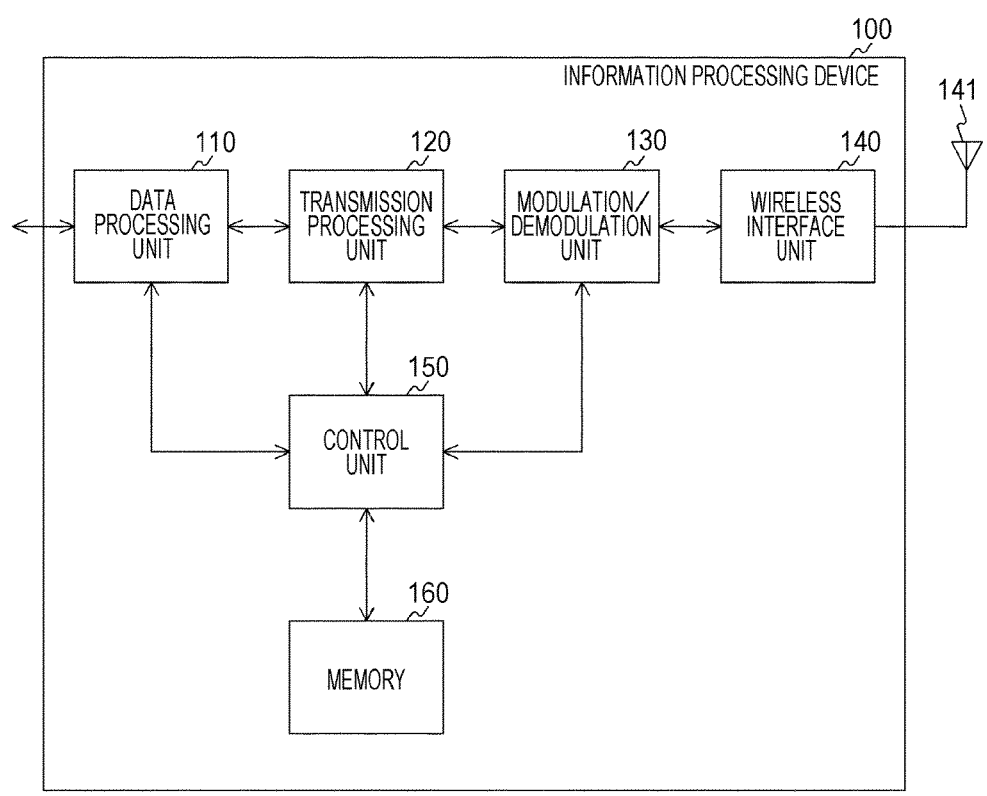
FIG. 2 is a block diagram illustrating a functional configuration example of an information processing device 100 in the first embodiment of the present technology.

FIG. 2 is a block diagram illustrating a functional configuration example of the information processing device 100 in the first embodiment of the present technology. Note that functional configurations (functional configurations related to the wireless communication) of the information processing device 200 and the access point 300 illustrated in FIG. 1 are approximately similar to that of the information processing device 100, and thus description here is omitted.

The information processing device 100 includes a data processing unit 110, a transmission processing unit 120, a modulation/demodulation unit 130, a wireless interface unit 140, an antenna 141, a control unit 150, and a memory 160.

The data processing unit 110 processes various data, based on control of the control unit 150. For example, the data processing unit 110 creates various data frames, a body of a data packet, and the like. For example, when performing a transmission operation, the data processing unit 110 creates the various data frames and the data packet according to a request from an upper layer, and supplies the created data frames and data packet to the transmission processing unit 120. Further, for example, when performing a reception operation, the data processing unit 110 processes and analyzes various data frames and a data packet supplied from the transmission processing unit 120.

The transmission processing unit 120 performs various types of transmission processing, based on control of the control unit 150. For example, when performing a transmission operation, the transmission processing unit 120 performs processing of adding a header for media access control and an error-detecting code to a packet generated by the data processing unit 110. For example, the transmission processing unit 120 performs processing of adding a media access control address (MAC) header for a MAC and the error-detecting code to the packet generated by the data processing unit 110. Then, the transmission processing unit 120 supplies processed data to the modulation/demodulation unit 130.

Further, when using carrier sense, the transmission processing unit 120 calculates a network allocation vector (NAV) to be added. Here, the carrier sense is an example of a scheme of arbitration for packet collision avoidance, and writes a transmission suppression time in content of the wireless packet and sets transmission suppression to an information processing device that has received the packet. Further, the NAV means the transmission suppression time.

Further, for example, when performing a reception operation, the transmission processing unit 120 performs reverse processing to the processing of at the time of the transmission operation (packet error detection, and analysis and removal of the MAC header, for example), for a bit string supplied from the modulation/demodulation unit 130. Then, when having confirmed that there is no error in the data frames, based on the error-detecting code, the transmission processing unit 120 supplies the various data frames to the data processing unit 110.

Further, the transmission processing unit 120 performs processing of virtual carrier sense. In this case, when the NAV is set to the header of the received packet and the transmission suppression is applied, the transmission processing unit 120 notifies the control unit 150 that the NAV is set and the transmission suppression is applied.

The modulation/demodulation unit 130 performs modulation/demodulation processing and the like, based on control of the control unit 150. For example, when performing a transmission operation, the modulation/demodulation unit 130 adds encoding, interleaving, modulation, a PLCP header, and a PLCP preamble to an input bit string from the transmission processing unit 120, based on coding and a modulation scheme set by the control unit 150. Then, the modulation/demodulation unit 130 generates a data symbol string and supplies the data symbol string to the wireless interface unit 140.

Further, when performing a reception operation, for example, the modulation/demodulation unit 130 performs reverse processing to the processing of at the time of the transmission operation, for an input from the wireless interface unit 140, and supplies a result to the transmission processing unit 120. Further, the modulation/demodulation unit 130 performs carrier sense processing. In this case, when having detected reception power that is equal to or more than a threshold, or having detected a value of preamble correlation that is equal to or more than a predetermined output, the modulation/demodulation unit 130 determines that the wireless communication is in a busy state, and notifies the control unit 150 of the busy state.

The wireless interface unit 140 is an interface connected with another information processing device and transmits/receives various types of information. For example, when performing a transmission operation, the wireless interface unit 140 converts an input from the modulation/demodulation unit 130 into an analog signal, performs amplification, filtering, and up conversion of a frequency, and transmits the processed signal from the antenna 141, as a wireless signal. Further, when performing a reception operation, for example, the wireless interface unit 140 performs reverse processing to the processing of at the time of transmission operation, for an input from the antenna 141, and supplies a result to the modulation/demodulation unit 130. Note that the wireless interface unit 140 is a part of a communication unit described in Claims.

The control unit 150 controls the respective reception operations and transmission operations of the data processing unit 110, the transmission processing unit 120, the modulation/demodulation unit 130, and the wireless interface unit 140. For example, the control unit 150 delivers information among the units, sets communication parameters, and performs scheduling of the packet in the transmission processing unit 120. Further, for example, when having received notification of a carrier sense result from the modulation/demodulation unit 130 and the transmission processing unit 120, the control unit 150 performs processing related to setting of the transmission suppression and cancellation of the setting, based on the notification.

Further, for example, the control unit 150 changes a detection threshold (packet detection threshold) for detecting a wireless communication signal, at timing after transmission of the device discovery request packet for performing direct inter-device wireless communication. For example, the control unit 150 sets a first threshold (packet detection threshold th1), as a detection threshold, when waiting for detection of the wireless communication signal transmitted from the access point 300 connected when indirect wireless communication is performed between the information processing device 100 and another information processing device. Meanwhile, the control unit 150 sets a second threshold (packet detection threshold th2) that is different from the first threshold, as the detection threshold, at timing after transmission of the device discovery request packet for discovering the information processing device 200 that can perform direct wireless communication with the information processing device 100.

In this case, for example, the control unit 150 waits for detection of the device discovery response packet transmitted from the information processing device 200 for a predetermined time after setting the second threshold, and sets the first threshold after an elapse of a predetermined time. In this case, the IEEE 802.11 specification is used as a protocol of the wireless communication, and the TDLS is used as a protocol that performs the direct wireless communication with the information processing device 200.

The memory 160 has a role of a work area of the data processing by the control unit 150, and has a function of a storage medium that stores various data. As the memory 160, a storage medium such as non-volatile memory, a magnetic disk, an optical disk, or a magneto optical (MO) disk can be used. As the non-volatile memory, electrically erasable programmable read-only memory (EEPROM) or erasable programmable ROM (EPROM) can be used, for example. As the magnetic disk, a hard disk or a disk-type magnetic body disk can be used, for example. Further, as the optical disk, a compact disc (CD), a digital versatile disc recordable (DVD-R), or a Blu-Ray disc (BD (registered trademark)) can be used, for example.

[Communication Example]

Figure 3:
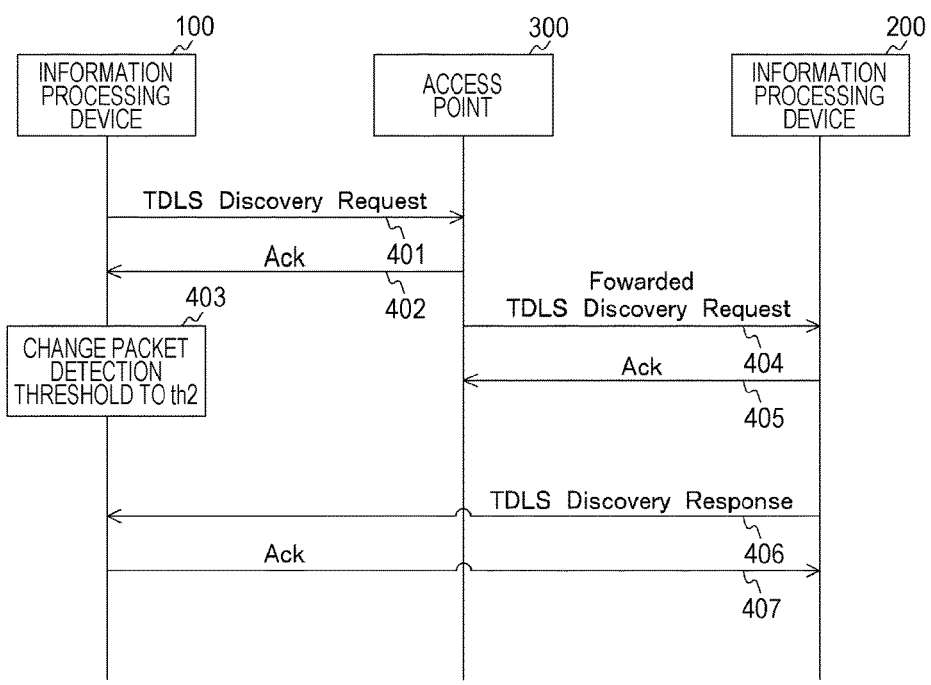
FIG. 3 is a sequence chart illustrating communication processing example among devices that configure the communication system 10 in the first embodiment of the present technology.

FIG. 3 is a sequence chart illustrating a communication processing example among the devices that configure the communication system 10 in the first embodiment of the present technology. FIG. 3 illustrates a sequence chart of a case in which the information processing devices 100 and 200 and the access point 300 exchange the TDLS Discovery Request frame and the TDLS Discovery Response frame.

Further, in a normal time, the information processing device 100 sets the detection threshold (packet detection threshold) of the packet received from the access point 300 to th1. The packet detection threshold th1 may be dynamically controlled based on quality of the communication between the information processing device 100 and the access point 300, or may be a fixed value.

First, the information processing device 100 transmits the TDLS Discovery Request frame addressed to the information processing device 200 to the access point 300 (401). When having correctly performed detection, reception, and decoding of the TDLS Discovery Request frame, the access point 300 transmits an acknowledgement (ACK) to the information processing device 100 (402).

Following that, the access point 300 transmits the received TDLS Discovery Request frame to the information processing device 200 (404). When having correctly performed detection, reception, and decoding of the TDLS Discovery Request frame, the information processing device 200 transmits an ACK to the access point 300 (405).

Following that, the information processing device 200 directly transmits the TDLS Discovery Response frame to the information processing device 100 (406).

Further, the information processing device 100 transmits the TDLS Discovery Request frame to the access point 300 (401), and changes the packet detection threshold for a predetermined time (403), after receiving the ACK from the access point 300 (402). To be specific, the information processing device 100 changes the packet detection threshold to the packet detection threshold th2 for directly receiving the TDLS Discovery Response frame from the information processing device 200 (403). Then, the information processing device 100 waits for detection of the packet with the packet detection threshold th2.

Here, a setting example of the packet detection threshold th2 set in waiting for detection of the TDLS Discovery Response frame will be described.

For example, assume a case in which an average communication rate from the information processing device 100 to the access point 300 is m [Mbps]. In this case, for example, assume a case in which a radio propagation state between the access point 300 and the information processing device 200 is satisfactory, and a data rate exceeding m [Mbps] can be achieved as a transmission rate in a physical layer (PHY). In this case, a time necessary for transmission can be decreased. However, an amount of data per unit time, which reaches the access point 300 from the information processing device 100, is merely m [Mbps]. Therefore, it is difficult that the information processing device 100 transmits data at an average rate that is larger than the m [Mbps].

Further, the information processing device 100 side may not be able to recognize transmission/reception rates and the number of spatial streams handled by the information processing device 200 side. Therefore, a transmission/reception capability of the information processing device 200 and a transmission path characteristic between the information processing device 200 and the access point 300 are assumed to be equal to those of the information processing device 100.

Then, the packet detection threshold can be set, based on a condition of at least not making a loss when the TDLS is used, when the transmission efficiency becomes equal between a case of performing data transmission through the access point 300 and a case of performing data transmission using the TDLS.

Note that the data transmission through the access point 300 is data transmission using two links (a link between the information processing device 100 and the access point 300, and a link between the information processing device 200 and the access point 300) having m [Mbps]. In this case, double time is used as a total.

For example, reception power that is estimated necessary to perform communication between the information processing device 100 and the information processing device 200, using an average data rate, is obtained, the average data rate being roughly half of the average data rate used by the information processing device 100 in the wireless transmission with the access point 300. Then, a value obtained based on the reception power (reception signal power) can be set as the packet detection threshold th2.

Further, about twice the use efficiency of the wireless communication resource can be provided. For example, reception power that is estimated necessary to perform communication between the information processing device 100 and the information processing device 200, using an average data rate, is obtained, the average data rate being about equal to the average data rate used by the information processing device 100 in transmission to the access point 300 by the wireless communication. Then, a value obtained based on the reception power (reception signal power) can be set as the packet detection threshold th2. Accordingly, the use efficiency of the wireless communication resource can be further improved.

In this way, the control unit 150 can obtain the packet detection threshold th2, based on the data rate (the average data rate, for example) that can be used in the wireless communication between the information processing device 100 and the access point 300. For example, the control unit 150 can obtain the packet detection threshold th2, based on the reception power of a case of performing the wireless communication, using the data rate or the data rate obtained based on the aforementioned data rate (the average data rate that is about half of the aforementioned data rate, for example).

In the above description, an example of obtaining the packet detection threshold, based on the reception signal power has been described. However, the packet detection threshold may be obtained using another information.

For example, the packet detection threshold may be obtained using an output value of an autocorrelation detector using periodicity in a training sequence of a known pattern provided in a reception packet. For example, the packet detection threshold may be obtained in combination of the output value and the reception signal power.

Further, the packet detection threshold may be obtained using a mutual correlation output value between the training sequence of a known pattern provided in a reception packet and a reference signal based on a training sequence waveform. Further, the packet detection threshold may be obtained in combination of the a mutual correlation output value between the training sequence of a known pattern provided in a reception packet and a reference signal based on a training sequence waveform, and the reception signal power.

By these combinations, the packet detection threshold can be calculated and managed as a reception power value in terms of antenna terminal input.

Further, when the detection, reception, and decoding of the TDLS Discovery Request frame from the information processing device 200 have been able to be correctly performed, the information processing device 100 directly transmits the ACK to the information processing device 200 (407).

In this way, the information processing device 100 changes the packet detection threshold from th1 to th2 at timing after transmission of the device discovery request packet. Further, the information processing device 100 waits for detection of the device discovery response packet transmitted from the information processing device 200 for a predetermined time after setting the packet detection threshold th2, and sets the packet detection threshold th1 after an elapse of a predetermined time.

Accordingly, for example, when the distance between the information processing device 100 and the information processing device 200 is relatively separated, the information processing device 100 does not detect the TDLS Discovery Response frame from the information processing device 200. In this case, the information processing device 100 can prevent the information processing device 200, which is relatively separated, from belonging to candidates with which the information processing device 100 performs the direct communication using the TDLS. Accordingly, the system can contribute to reduction in the wireless communication resource, and can effectively use the wireless communication resource.

[Configuration Example of Communication System]

Figure 4:
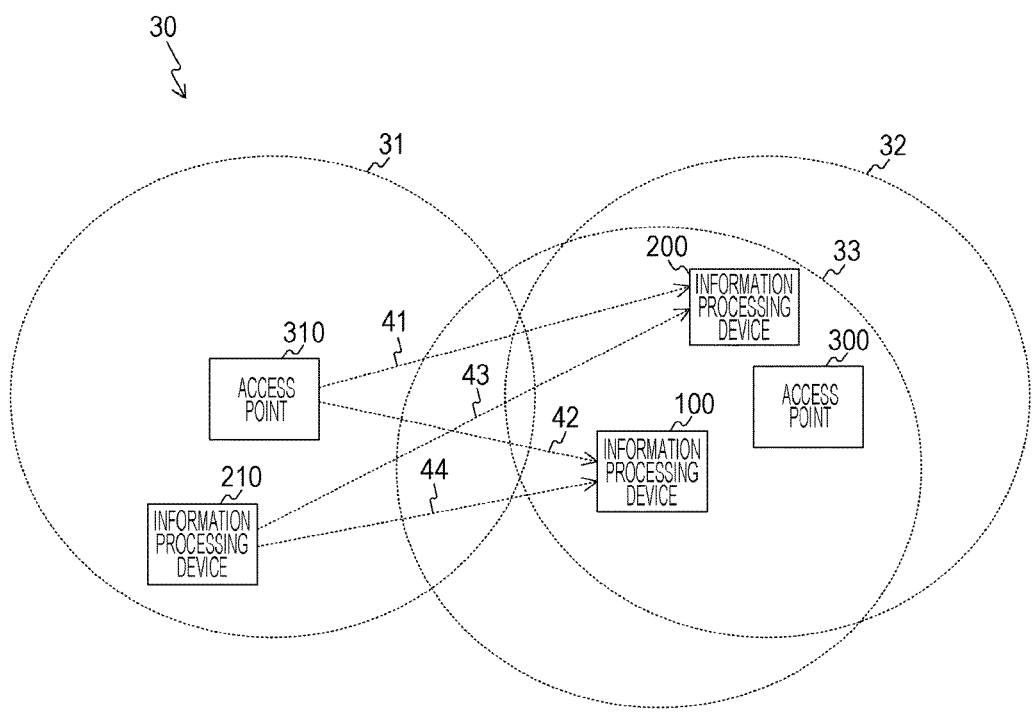
FIG. 4 is a sequence chart illustrating communication processing example among devices that configure the communication system 30 in the first embodiment of the present technology.

FIG. 4 is a diagram illustrating a system configuration example of the communication system 30 in the first embodiment of the present technology.

The communication system 30 includes the information processing device 100, the information processing device 200, an information processing device 210, the access point 300, and an access point 310. Note that the communication system 30 is a communication system obtained such that the information processing device 210 and the access point 310 are added in the communication system 10 illustrated in FIG. 1. Further, the information processing device 210 is an information processing device similar to the information processing device 100 and the information processing device 200 illustrated in FIG. 1. Further, the access point 310 is an access point similar to the access point 300 illustrated in FIG. 1.

In FIG. 4 a packet detection range (signal detection range) based on a packet detection threshold set to the access point 310 is schematically illustrated by the dotted line circle 31. Similarly, a packet detection range based on a packet detection threshold set to the access point 300 is schematically illustrated by the dotted line circle 32.

Further, a packet detection range based on the packet detection threshold th2 set to the information processing device 100 is schematically illustrated by the dotted line circle 33. For example, the packet detection range (the dotted line circle 33) based on the packet detection threshold th2 set to the information processing device 100 includes the information processing device 200 and the access point 300, but does not include the information processing device 210 and the access point 310.

[Packet Reception Processing Example and Transmission Suppression Processing Example]

Figure 5A:
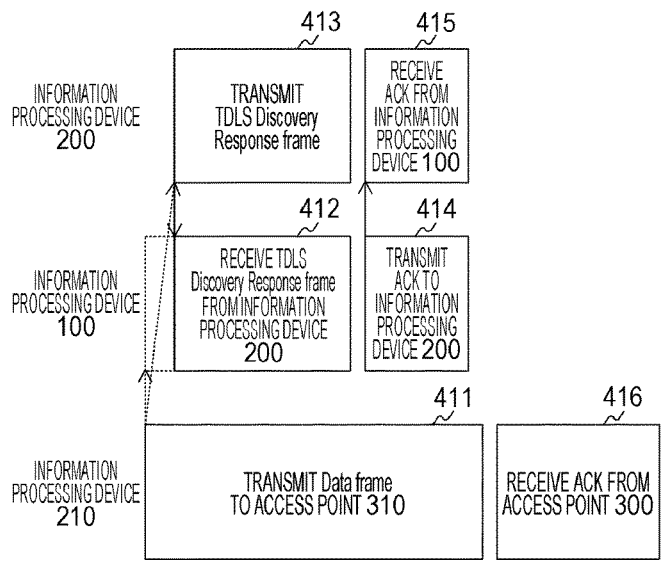
FIGS. 5A and 5B are diagrams illustrating, in time series, examples of packet reception processing and transmission suppression processing among information processing devices that configure a communication system 30 in the first embodiment of the present technology.
Figure 5B:
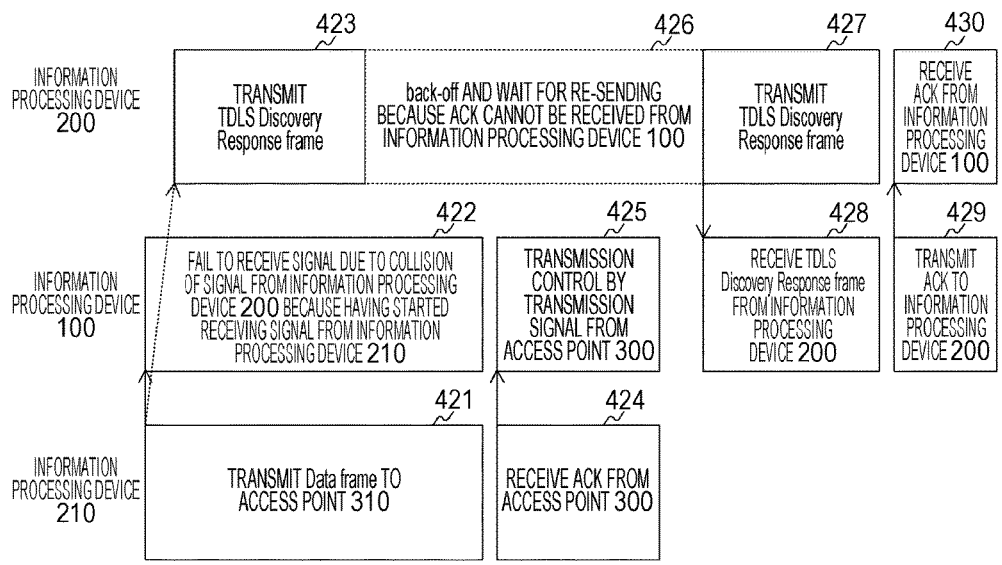

FIGS. 5A and 5B are diagrams illustrating, in time series, examples of packet reception processing and transmission suppression processing among the information processing devices that configure the communication system 30 in the first embodiment of the present technology. In FIGS. 5A and 5B, the horizontal axis represents a time axis.

FIG. 5A illustrates an example of a case of setting the packet detection threshold th2 in the information processing device 100.

FIG. 5B illustrates an example of a case of not setting the packet detection threshold th2 in the information processing device 100. That is, FIG. 5B illustrates an example of a case of using the information processing device 100 without changing the packet detection threshold th1. Further, the packet detection threshold th1 is a value of an extent of detecting a transmission signal from the information processing device 210. Further, a packet detection range based on the packet detection threshold th1 is larger than the dotted line circle 33 (the packet detection range based on the packet detection threshold th2) illustrated in FIG. 4, and includes the information processing device 210 and the access point 310. Therefore, when the packet detection threshold th1 is set, the information processing device 100 detects a transmission signal (dotted straight line 44) from the information processing device 210. Note that, even if the packet detection threshold th1 is set, the information processing device 200 does not detect the transmission signal (dotted straight line 43) from the information processing device 210.

Here, as illustrated in FIG. 4, assume a case in which the another information processing device 210 other than the information processing device 100 and the information processing device 200 exists. In this case, for example, assume a case in which the information processing device 200 exists near the information processing device 100, and a transmission signal from the information processing device 210 associated with the access point 310 exists.

As illustrated in FIG. 4, when the distance between the information processing device 100 and the information processing device 200 is relatively close, the wireless communication resource can be optimally used by using the TDLS.

Here, the information processing device 100 has a possibility of receiving a Data frame from the information processing device (the information processing device 210 associated with the access point 310, for example) other than the information processing device 200.

For example, assume a case in which the information processing device 100 transmits the TDLS Discovery Request frame addressed to information processing device 200. In this case, as illustrated in FIG. 5B, the information processing device 200 transmits the TDLS Discovery Response frame addressed to the information processing device 100 (423). However, the information processing device 210 may transmit the Data frame addressed to the access point 310 before the TDLS Discovery Response frame (421).

In this case, the information processing device 100 can receive the Data frame from the information processing device 210. Therefore, by the start of the reception, the suppression control is set in the information processing device 100, and the information processing device 100 becomes not able to receive a signal from the information processing device 200 (422). Meanwhile, it is difficult that the information processing device 200 receives the Data frame from the information processing device 210, the transmission suppression is not set. Therefore, the information processing device 200 transmits the TDLS Discovery Response frame addressed to the information processing device 100 (423).

However, the information processing device 100 has already started receiving an undesired wave (the Data frame from the information processing device 210). Therefore, it is difficult that the information processing device 100 receives a desired wave (the TDLS Discovery Response frame from the information processing device 200) (422).

Further, it is difficult that the information processing device 100 receives another signal until when the reception of the transmission signals from the information processing device 210 and the access point 310, and the transmission suppression is kept set (424, 425). Therefore, it is difficult that the information processing device 100 immediately receives the TDLS Discovery Response from the information processing device 200 with which the TDLS needs to establish (425, 426).

Further, when not receiving the ACK from the information processing device 100, the information processing device 200 repeatedly re-sends the TDLS Discovery Response frame (426, 427).

Further, the information processing device 100 becomes able to receive the TDLS Discovery Response frame from the information processing device 200 at timing when a predetermined condition is satisfied (428). Here, the timing when a predetermined condition is satisfied is timing when the reception of the transmission signals from the information processing device 210 and the access point 310 ends, and the information processing device 200 becomes to have the re-sending time of the TDLS Discovery Response frame.

Then, when having received the TDLS Discovery Response frame (428), the information processing device 100 transmits the ACK addressed to the information processing device 200 (429). Further, the information processing device 200 receives the ACK from the information processing device 100 (430).

Note that, for example, back-off and waiting for re-sending of the TDLS Discovery Response frame in the information processing device 200 may be during transmission by the information processing device 210 or during transmission of the ACK from the access point 300. In this case, it is difficult for the information processing device 100 to receive the TDLS Discovery Response frame again, and re-re-sending is performed. Therefore, time to discover a device becomes further longer.

As described above, since the information processing device 100 detects the transmission signal from the information processing device 210, the time to discover the information processing device 200 in device discovery processing becomes long. Therefore, in the first embodiment of the present technology, a value of an extent that the information processing device 100 does not detect the transmission signal from the information processing device 210 is set as the packet detection threshold th2. Accordingly, the detection of the transmission signal from the information processing device 210 can be prevented.

For example, assume a case in which the information processing device 100 transmits the TDLS Discovery Request frame addressed to the information processing device 200. In this case, as illustrated in FIG. 5A, the information processing device 200 transmits the TDLS Discovery Response frame addressed to the information processing device 100 (413). Here, the information processing device 210 may transmit the Data frame addressed to the access point 310 before the TDLS Discovery Response frame (411).

Even in this case, since the packet detection threshold th2 is set, it is difficult that the information processing device 100 detects the Data frame from the information processing device 210. Therefore, the transmission suppression is not set in the information processing device 100. Further, the information processing device 100 can receive the TDLS Discovery Response frame from the information processing device 200 (412).

Then, after receiving the TDLS Discovery Response frame (412), the information processing device 100 transmits the ACK addressed to the information processing device 200 (414). Further, the information processing device 200 receives the ACK from the information processing device 100 (415).

Note that exchange of the Data frame and the ACK is performed between the information processing device 210 and the access point 310 (411, 416).

As described above, the information processing device 100 can prevent setting of the transmission suppression and reception of the undesired wave, by setting the packet detection threshold th2. Accordingly, the information processing device 100 can ignore the transmission signal from the information processing device 210. Further, the information processing device 100 can only detect and receive the TDLS Discovery Response frame from the information processing device 200.

That is, the information processing device 100 can accurately detect only a partner device existing in the vicinity and with which the TDLS is used. Accordingly, a delay due to collision of packets or the transmission suppression, and a waste of the wireless communication resource can be minimized.

2. Second Embodiment

In a second embodiment of the present technology, an example in which an access point accumulates data addressed to an information processing device to which a packet detection threshold th2 is set. Note that configurations of respective devices in the second embodiment of the present technology are approximately the same as the devices illustrated in FIGS. 1 and 2, and the like. Therefore, parts common to the first embodiment of the present technology are denoted with the same reference signs as the first embodiment of the present technology, and a part of description thereof is omitted.

[Communication Example]

Figure 6:
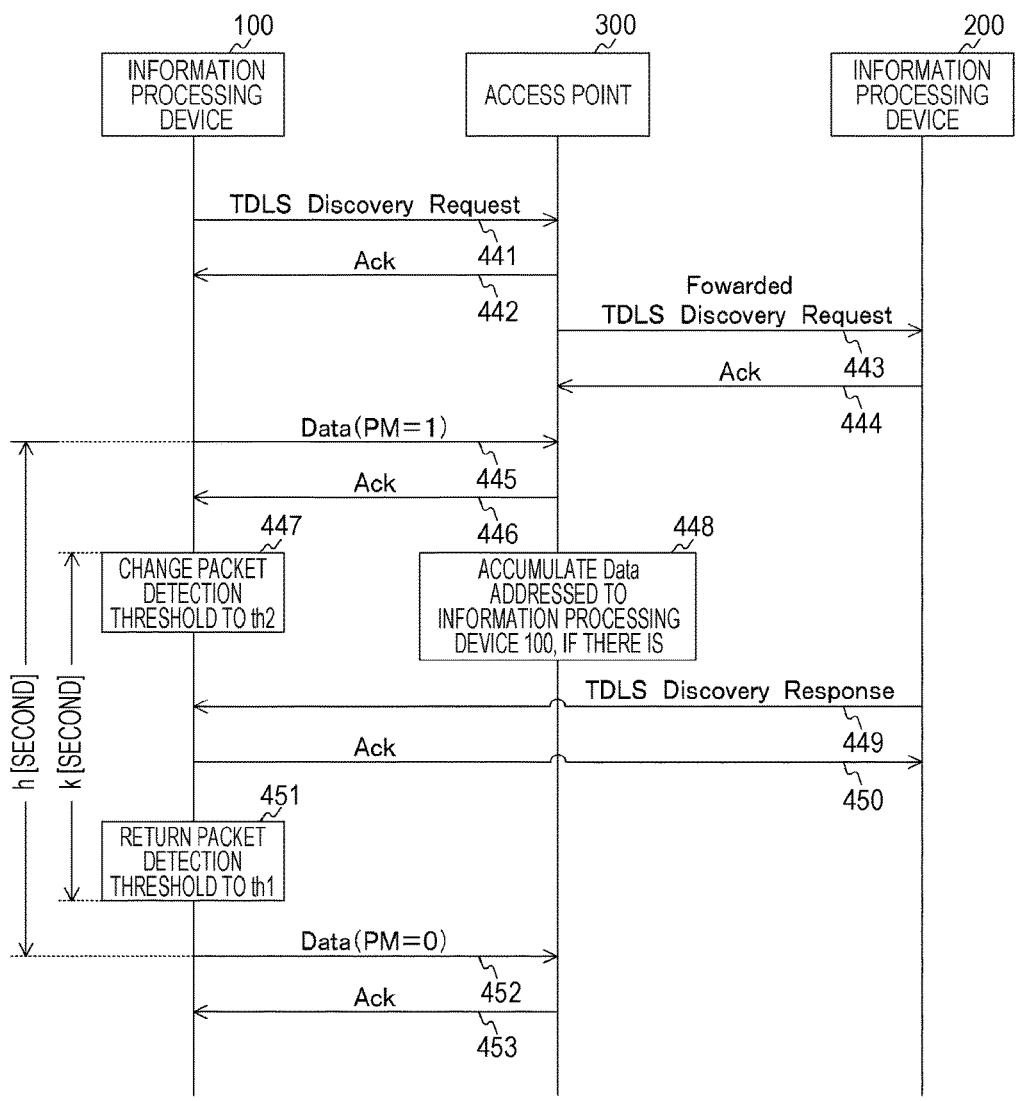
FIG. 6 is a sequence flowchart illustrating a communication processing example among devices that configure a communication system in a second embodiment of the present technology.
Figure 7:
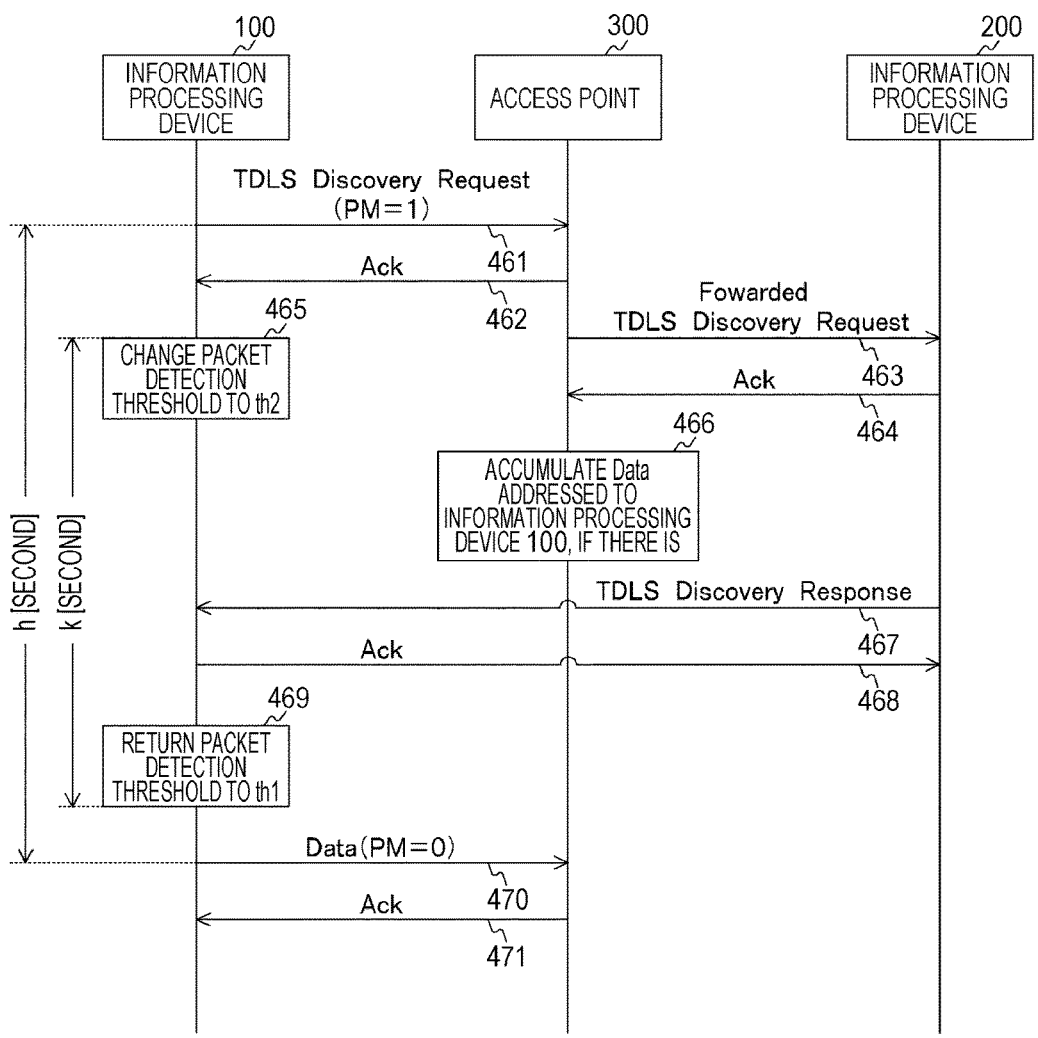
FIG. 7 is a sequence flowchart illustrating a communication processing example among devices that configure a communication system in a second embodiment of the present technology.

FIGS. 6 and 7 are sequence charts illustrating communication processing examples among devices that configure a communication system in the second embodiment of the present technology. FIGS. 6 and 7 illustrate sequence charts of when an information processing device 100 notifies an access point 300 that it is difficult for the information processing device 100 to receive a packet, using power save information.

FIG. 6 illustrates an example of notifying PM (power management)=1 stored in frame control of a MAC header, using a frame other than a TDLS Discovery Request frame.

FIG. 7 illustrates an example of notifying PM=1 stored in the frame control of the MAC header, using the TDLS Discovery Request frame.

As described above, a packet detection threshold th1 is a threshold with which a reception signal (packet) from the access point 300 can be detected. Further, a packet detection threshold th2 is a threshold for detecting a TDLS Discovery Response frame.

Assume a case in which the relationship between the packet detection thresholds th1 and th2 is th2>th1. In this case, in a time band (k [second]) in which the packet detection threshold th2 is set, it is difficult that the information processing device 100 detects a packet that does not exceed the packet detection threshold th2, of packets transmitted from the access point 300. Therefore, the information processing device 100 may not be able to detect and receive all of the packets from the access point 300.

Here, assume a case in which, in the time band (k [second]) in which the packet detection threshold th2 is set, the access point 300 transmits data addressed to the information processing device 100. In this case, when an ACK (or Block ACK) from the information processing device 100 is not returned, the access point 300 may perform a series of re-sending and may waste the wireless communication resource. Further, for example, when the time band (k [second]) in which the packet detection threshold th2 is set is long, the access point 300 may determine that the information processing device 100 has gone, and may cut the connection.

Therefore, in the second embodiment of the present technology, the information processing device 100 notifies the access point 300 that the information processing device 100 does not receive a packet until a predetermined time passes from when the information processing device 100 receives an ACK to the TDLS Discovery Request frame. Here, the time not to receive a packet can be set to h [second] (a value of k [second] or more).

To be specific, as illustrated in FIG. 6, the information processing device 100 transmits the TDLS Discovery Request frame to the access point 300 (441). Further, the access point 300 transmits the ACK to the TDLS Discovery Request frame to the information processing device 100 (442). Further, the access point 300 transmits the TDLS Discovery Request frame to an information processing device 200 (443). Further, the information processing device 200 transmits the ACK to the TDLS Discovery Request frame to the access point 300 (444).

Here, the information processing device 100 sets PMbit stored in the frame control of the MAC header in Data frame to 1, and transmits the PMbit to the access point 300 (445). By the transmission, the information processing device 100 can notifies the access point 300 that the own device is in the power save state and it is difficult to receive a packet.

Note that, when the data to be transmitted as the Data frame does not exist in the information processing device 100, the information processing device 100 can specify Null Function in a subtype of the Data frame.

Further, the access point 300 transmits the ACK to the Data frame to the information processing device 100 (446). Further, when having received data addressed to the information processing device 100 from another device, the access point 300 accumulates the data for h [second] (448).

Further, the information processing device 100 changes the packet detection threshold from th1 to th2 (447) after receiving the ACK to the Data frame from the access point 300 (446).

Further, the information processing device 200 directly transmits a TDLS Discovery Response frame to the information processing device 100 (449). When having correctly performed detection, reception, and decoding of the TDLS Discovery Request frame from the information processing device 200, the information processing device 100 directly transmits the ACK to the information processing device 200 (450).

Further, the information processing device 100 returns the packet detection threshold from th2 to th1 (451) after k [second] passes after changing the packet detection threshold from th1 to th2.

Following that, the information processing device 100 sets the PMbit stored in the frame control of the MAC header in the Data frame to 0, and transmits the PMbit to the access point 300 (452). This transmission is performed after h [second] passes after transmission of the Data frame in which the PMbit is set to 1 (452). By the transmission, the information processing device 100 can notify the access point 300 that the information processing device 100 cancels the power save of the own device and can receive a packet.

Note that, when data to be transmitted as the Data frame does not exist in the information processing device 100, the information processing device 100 can specify Null Function in the subtype of the Data frame.

Further, the access point 300 transmits the ACK to the Data frame to the information processing device 100 (453). Further, when data addressed to the information processing device 100 is accumulated, the access point 300 transmits the accumulated data to the information processing device 100.

In the above description, an example of notifying PM=1, using a frame other than the TDLS Discovery Request frame has been described. Note that PM=1 can be notified using the TDLS Discovery Request frame. In this case, the transmission of the Data frame in which the PM bit=1 can be omitted. This example is illustrated in FIG. 7.

Here, FIG. 7 is different from FIG. 6 in that PM=1 is notified using the TDLS Discovery Request frame (461), and the transmission of the Data frame and the ACK (445 and 446 illustrated in FIG. 6) are omitted. Other points are approximately similar to FIG. 6, and detailed description here is omitted.

Note that it is difficult that the information processing device 100 recognizes a time necessary when the access point 300 transmits the TDLS Discovery Request frame addressed to the information processing device 200 (463, 464), in advance. Therefore, it is difficult that the example illustrated in FIG. 7 sets k [second] longer than the example illustrated in FIG. 6.

As described above, an example of notifying PM=1, using the TDLS Discovery Request frame or a frame other than the TDLS Discovery Request frame, and notifying PM=0, using the Data frame. However, the embodiment is not limited to these examples.

For example, when exiting from the power save, Power Save (PS)-Poll frame may be transmitted, instead of the transmission of the Data frame in which the PM bit in the MAC header is set to 0.

Further, a new protocol may be defined, for example. For example, the information processing device 100 may notify and specify the access point 300 that the data addressed to the information processing device 100 should be accumulated at the access point 300 side, because the information processing device 100 does not receive a packet for a predetermined time.

Further, assume a case in which a wireless communication parent station to which the information processing device 100 is connected is not the access point 300 but Group Owner in Wi-Fi Direct. In this case, the information processing device 100 can notify that it is difficult for the information processing device 100 to receive a packet from Group Owner, by transmitting Notice Of Absence. Regarding transmission of this Notice Of Absence, for example, "Wi-Fi Direct Technical Specification V1.0" can be referred.

As described above, a control unit 150 can notify the access point 300 that the information processing device 100 does not receive a wireless communication signal while the packet detection threshold th2 is being set, when a value larger than the packet detection threshold th1 is set as the packet detection threshold th2.

3. Third Embodiment

In a third embodiment of the present technology, an example in which an information processing device appropriately receives a packet from an access point during TDLS communication will be described. Note that configurations of devices in the third embodiment of the present technology are approximately similar to those described in FIGS. 1 and 2. Therefore, parts common to the first embodiment of the present technology are denoted with the same reference sign as the first embodiment of the present technology, and a part of description thereof is omitted.

[Setting Example of Packet Detection Threshold]

Figure 8A:
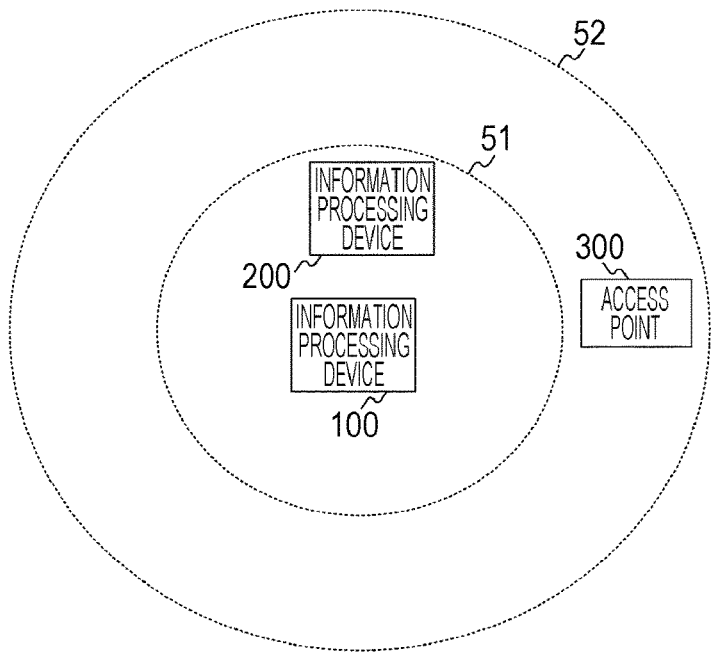
FIGS. 8A and 8B are diagrams schematically illustrating relationships between positions of devices that configure a communication system in a third embodiment of the present technology, and packet detection ranges based on packet detection thresholds.
Figure 8B:
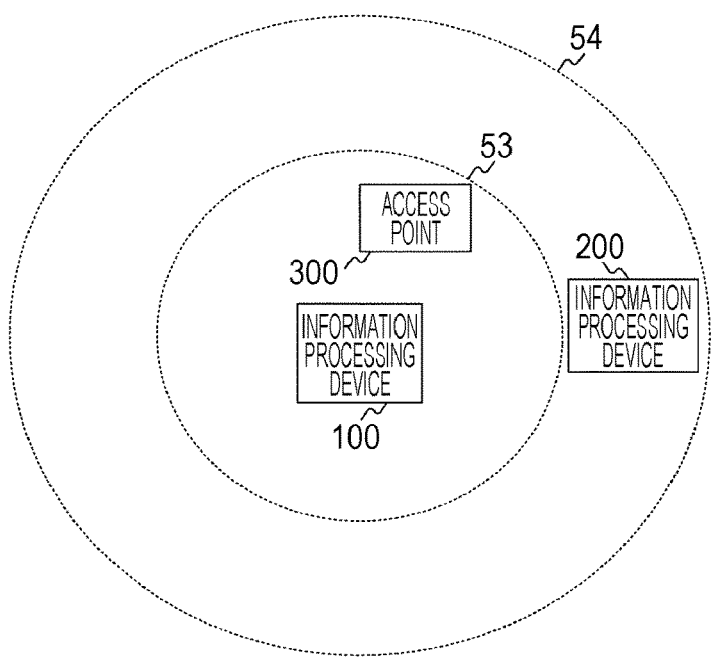

FIGS. 8A and 8B are diagrams schematically illustrating relationships between positions of respective devices that configure a communication system in the third embodiment of the present technology and packet detection ranges based on packet detection thresholds. To be specific, FIGS. 8A and 8B illustrate packet detection ranges when min{th1, th2} is used during TDLS communication.

FIG. 8A illustrates a relationship between a packet detection range 51 based on a packet detection threshold th2, and a packet detection range 52 based on a packet detection threshold th1.

FIG. 8B illustrates a relationship between a packet detection range 53 based on the packet detection threshold th1, and a packet detection range 54 based on the packet detection threshold th2.

As described above, while an information processing device 100 stands by for reception of a TDLS Discovery Response frame, transmission data to the information processing device 100 can be accumulated in a buffer of an access point 300 for a predetermined time.

Here, assume a state in which the information processing device 100 sets up direct-link, using the TDLS, and directly transmit/receive data to/from an information processing device 200. In this case, for example, assume a case in which only the information processing device 100 generates data to be transmitted to the information processing device 200 and it is known that the transmission data is generated only during a certain limited time. In this case, the same communication method as the method of notifying the access point 300 that it is difficult for the information processing device 100 to receive a packet when waiting for the TDLS Discovery Response frame can be used. That is, a communication method of performing TDLS communication in a state where the information processing device 100 sets the packet detection threshold to th2, while the transmission data from the access point 300 to the information processing device 100 is buffered in the access point 300, can be considered.

Here, assume a case in which communication using a transmission control protocol (TCP) is performed in an upper layer. In this case, TCP ACK is transmitted from the information processing device 200 to the information processing device 100 as Data frame, on IEEE 802.11. Further, transmission timing thereof is unstable for the information processing device 100. In such a case, the above-described condition may not necessarily be satisfied.

Therefore, in the third embodiment of the present technology, either smaller one of th1 and th2 is selected as the packet detection threshold, from when the direct-link of the TDLS is set up to when the direct-link of the TDLS is cut. By the setting, a rate of detection of an interference packet around the information processing device 100 is increased. However, the information processing device 100 becomes able to appropriately detect and receive the transmission packet from the information processing device 200, and the transmission packet from the access point 300.

For example, as illustrated in FIG. 8A, in a case of th1<th2, th1 (=min{th1, th2}) is set during the TDLS communication. Further, for example, as illustrated in FIG. 8B, in a case of th2<th1, th2 (=min{th1, th2}) is set during the TDLS communication.

[Operation Example of Information Processing Device]

Figure 9:
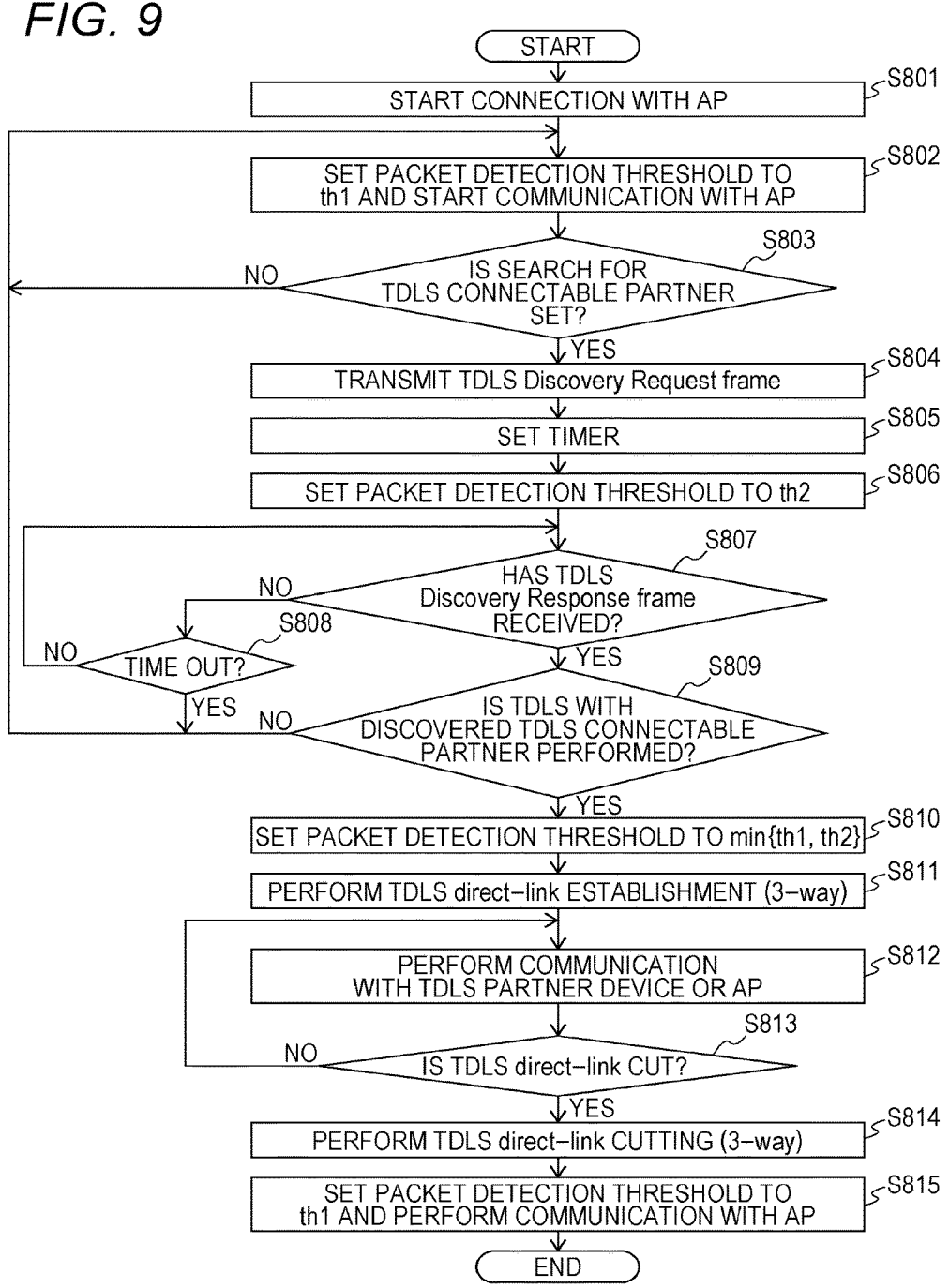
FIG. 9 is a flowchart illustrating an example of a processing procedure of communication processing by an information processing device 100 in the third embodiment of the present technology.

FIG. 9 is a flowchart illustrating an example of a processing procedure of communication processing by the information processing device 100 in the third embodiment of the present technology. FIG. 9 illustrates an example of setting min{th1, th2} as the packet detection threshold during the TDLS communication.

First, a control unit 150 of the information processing device 100 starts connection processing with an access point (step S801). Following that, the control unit 150 sets the packet detection threshold to th1 and starts communication with the access point (step S802).

Following that, the control unit 150 determines whether setting of searching for a TDLS connectable partner is set (step S803). When the setting of searching for a TDLS connectable partner is not set (step S803), the processing is returned to step S802. The setting of searching for a TDLS connectable partner is set according to a user operation, for example. The setting may also be automatically set.

When the setting of searching for a TDLS connectable partner is set (step S803), the control unit 150 transmits the TDLS Discovery Request frame to search for the TDLS connectable partner (step S804). Following that, the control unit 150 sets a timer (step S805).

Following that, the control unit 150 sets the packet detection threshold to th2 (step S806). Note that step S806 is an example of a control procedure (control procedure of changing the detection threshold) described in Claims.

Following that the control unit 150 determines whether having received the TDLS Discovery Response frame (step S807). When having not received the TDLS Discovery Response frame (step S807), the control unit 150 determines whether it has been timed out (step S808). Then, when it has been timed out (step S808), the processing is returned to step S802. Meanwhile, it has not been timed out (step S808), the processing is returned to step S807.

When having received the TDLS Discovery Response frame (step S807), the control unit 150 determines whether setting of performing TDLS communication with the discovered TDLS possible partner device is set (step S809). The setting of performing TDLS communication with the discovered TDLS possible partner device is set according to a user operation, for example. Further, the setting may be automatically set. Then, when the setting of performing TDLS communication with the discovered TDLS possible partner device is not set (step S809), the processing is returned to step S802.

Further, when the setting of performing TDLS communication with the discovered TDLS possible partner device is set (step S809), the control unit 150 sets min{th1, th2} as the packet detection threshold (step S810). Following that, the control unit 150 performs TDLS direct-link establishment (3-way) with the discovered TDLS possible partner device (step S811).

Following that, the control unit 150 performs communication with the TDLS partner device or the access point (step S812). Following that, the control unit 150 determines whether cutting the TDLS direct-link (step S813). For example, when a user operation to cut the TDLS direct-link is performed, the control unit 150 can determine to cut the TDLS direct-link when exchange of data to be communicated is terminated.

When the TDLS direct-link is not cut (step S813), the processing is returned to step S812. Meanwhile, when the TDLS direct-link is cut (step S813), the control unit 150 performs the TDLS direct-link cutting (3-way) (step S814). Following that, the control unit 150 sets th1 as the packet detection threshold, and continues the communication with the access point (step S815).

As described above, the control unit 150 can set the smaller value of th1 and th2, as the packet detection threshold, while the direct wireless communication link is being established with another information processing device, after receiving the device discovery response packet from the another information processing device. Further, the control unit 150 can set the packet detection threshold th1 at timing when having cut the direct wireless communication link with the another information processing device.

[Control Example of Transmission Power]

As described above, while the TDLS link is being connected, the packet detection threshold can be set to min{th1, th2}. Note that, in this case, a transmission wave may interfere another device (the information processing device or the access point, for example) positioned in a packet transmission range detected between min{th1, th2} and max{th1, th2}.

Therefore, when the information processing device 100 performs transmission to the information processing device 200, it is favorable to perform transmission power control within a range in which communication quality between the information processing device 100 and the information processing device 200 is maintained. Further, when the information processing device 100 performs transmission to the access point 300, it is favorable to perform the transmission power control within a range where communication quality between the information processing device 100 and the access point 300 is maintained.

Here, the range in which the communication quality between the devices is maintained means a range in which a predetermined data rate can be secured between the packet detection range based on the packet detection threshold th1, and the packet detection range based on the packet detection threshold th2. This range can be calculated based on a value (a parameter of the communication quality, for example) that can be observed in the information processing device 100. Here, the parameter of the communication quality is, for example, a ratio of signal strength and a noise component (noise power, for example) of the signal strength, an estimated pass loss, or the number of times of allowable re-sending. Note that the ratio of signal strength and a noise component of the signal strength is, for example, a signal to noise ratio (SNR), a signal to interference power ratio (SIR), or a signal to interference and noise power ratio (SINR).

Further, the communication quality between the information processing device 100 and the information processing device 200 can be observed (measured) in the information processing device 100. Then, the information processing device 100 can determine the transmission power within the range where the communication quality between the information processing device 100 and the information processing device 200 is maintained, based on a value obtained by the observation.

Similarly, the communication quality between the information processing device 100 and the access point 300 can be observed (measured) in the information processing device 100. Then, the information processing device 100 can determine the transmission power within the range in which the communication quality between the information processing device 100 and the access point 300 is maintained, based on a value obtained by the observation. As described above, the transmission power control can be performed within the range in which the communication quality between the devices is maintained.

[Control Example of Transmission Power based on Communication Quality Observed in Another Device]

In the above description, an example of observing and obtaining the communication quality between the devices by the own device has been described. However, the communication quality between the devices observed by another device may be obtained and used.

For example, the information processing device 200 observes the communication quality between the information processing device 100 and the information processing device 200, and transmits a wireless communication packet, including information related to an observation result (observation result information), to the information processing device 100. In this case, the information processing device 100 that has received the observation result information can determine the transmission power for each destination, based on the received observation result information.

Further, for example, the access point 300 observes the communication quality between the information processing device 100 and the access point 300, and transmits a wireless communication packet, including observation result information, to the information processing device 100. In this case, the information processing device 100 that has received the observation result information can determine the transmission power for each destination, based on the received observation result information.

Further, another device may determine the transmission power, based on the communication quality between the devices observed by the another device, and the information processing device 100 may control the transmission power for each destination, based on the determined transmission power.

For example, the information processing device 200 observes the communication quality between the information processing device 100 and the information processing device 200, and determines the transmission power within the range in which the communication quality between the information processing device 100 and the information processing device 200 is maintained, based on the observation result. Then, the information processing device 200 transmits a wireless communication packet, including control information related to the determined transmission power (transmission power control information), to the information processing device 100. In this case, the information processing device 100 that has received the transmission power control information can determine the transmission power for each destination, based on the received transmission power information.

Further, for example, the access point 300 observes the communication quality between the information processing device 100 and the access point 300, and determines the transmission power within the range in which the communication quality between the information processing device 100 and the access point 300 is maintained, based on the observation result. Then, the access point 300 transmits a wireless communication packet, including control information related to the determined transmission power (transmission power control information), to the information processing device 100. In this case, the information processing device 100 that has received the transmission power control information can determine the transmission power for each destination, based on the received transmission power information.

As described above, the control unit 150 can perform the transmission power control, when either smaller value of th1 and th2 is set as the packet detection threshold, while the direct wireless communication link is being established between the information processing device 100 and the information processing device 200. For example, the control unit 150 can perform the transmission power control for performing transmission to the information processing device 200 within the range in which the communication quality between the information processing device 100 and the information processing device 200 can be maintained. Further, for example, the control unit 150 can perform the transmission power control for performing transmission to the access point 300 within the range in which the communication quality between the information processing device 100 and the access point 300 can be maintained.

4. Fourth Embodiment

In a fourth embodiment of the present technology, an example of avoiding re-sending of a TDLS Discovery Response frame. Note that configurations of devices in the fourth embodiment of the present technology are approximately the same as the devices illustrated in FIGS. 1 and 2, and the like. Therefore, parts common to the first embodiment of the present technology are denoted with the same reference signs as the first embodiment of the present technology, and a part of description thereof is omitted.

[Example of Avoiding Re-Sending of TDLS Discovery Response Frame]

Figure 10:
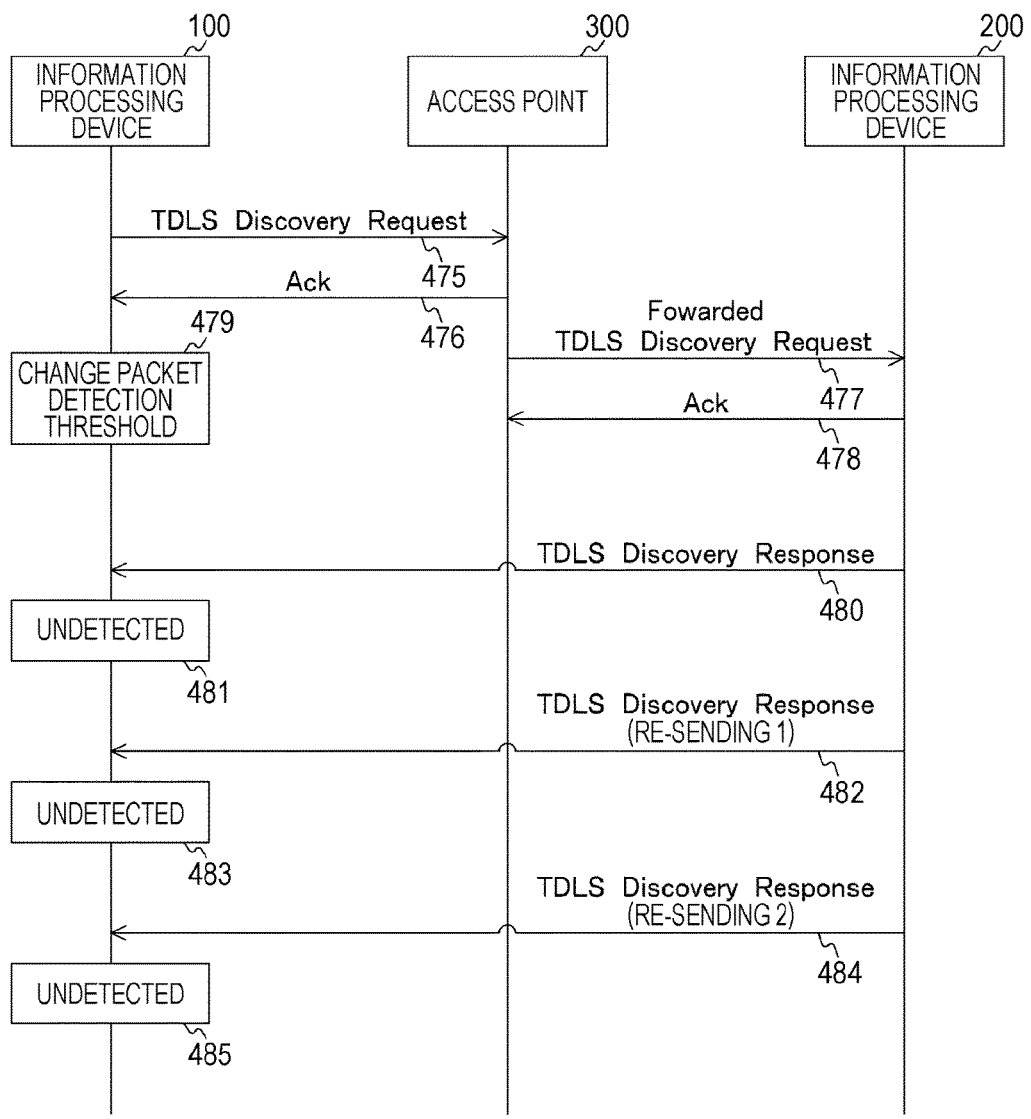
FIG. 10 is a sequence chart illustrating a communication processing example among devices that configure a communication system in a fourth embodiment of the present technology.
Figure 11:
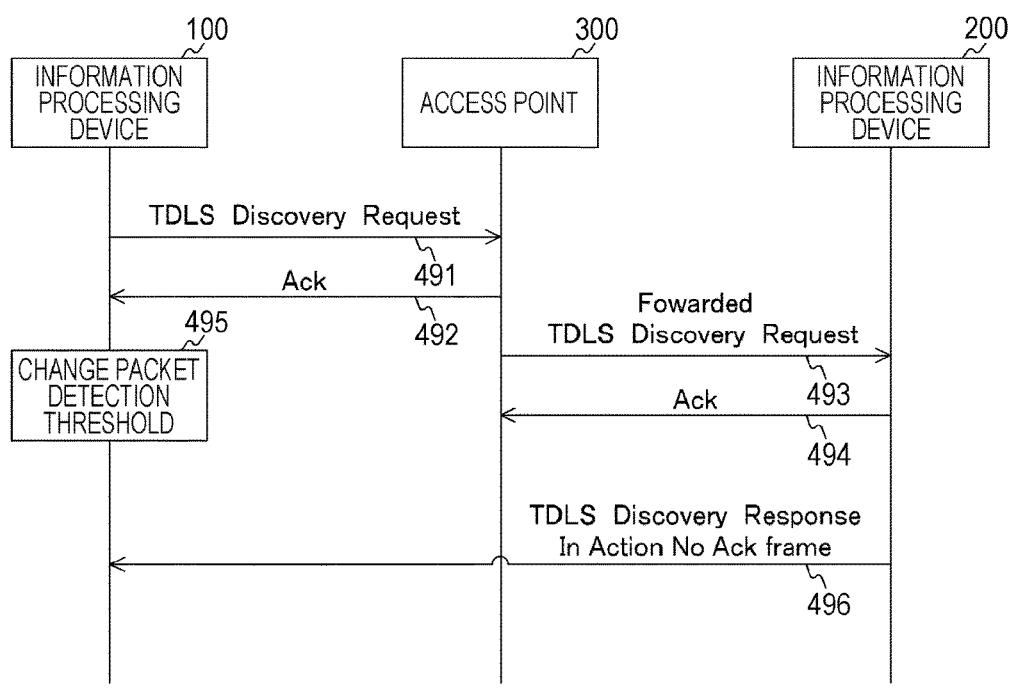
FIG. 11 is a sequence chart illustrating a communication processing example among devices that configure a communication system in a fourth embodiment of the present technology.

FIGS. 10 and 11 are sequence charts illustrating communication processing examples among devices that configure a communication system in the fourth embodiment of the present technology.

FIG. 10 illustrates an example in which it is difficult that an information processing device 200 receives an ACK from an information processing device 100, and the information processing device 200 re-sends a TDLS Discovery Response frame by the number of predetermined set times. FIG. 11 illustrates an example of a case in which the information processing device 200 does not re-send the TDLS Discovery Response frame.

Note that processing (475 to 480) illustrated in FIG. 10 corresponds to the processing (401 to 406) illustrated in FIG. 3. Therefore, detailed description here is omitted.

As described above, the information processing device 100 changes a packet detection threshold from th1 to th2 for a predetermined time (479) after transmission of a TDLS Discovery Request frame to an access point 300, and receiving an ACK (475 and 476). Then, the information processing device 100 waits for packet detection of the TDLS Discovery Response frame with the packet detection threshold th2.

Here, assume a case in which a relatively large value is set as the packet detection threshold th2, and a distance between the information processing device 100 and the information processing device 200 is relatively separated. In this case, there is a possibility that reception power of the TDLS Discovery Response frame from the information processing device 200 is insufficient during waiting for packet detection of the TDLS Discovery Response frame. If the reception power of the TDLS Discovery Response frame from the information processing device 200 is insufficient as described above, there is a possibility that the TDLS Discovery Response frame is not detected (481, 483, and 485). When the TDLS Discovery Response frame from the information processing device 200 is not detected as described above (481, 483, and 485), the ACK is not transmitted from the information processing device 100 to the information processing device 200. In this case, it is difficult for the information processing device 200 to receive the ACK from the information processing device 100, and thus re-sending of the TDLS Discovery Response frame is performed by the number of times set in the information processing device 200 in advance (482 and 484). Note that FIG. 10 illustrates an example of repeating the re-sending twice, for ease of description.

As described above, when the information processing device 200 does not receive the ACK from the information processing device 100, the information processing device 200 repeatedly re-sends the TDLS Discovery Response frame. In this case, a wireless communication resource is wasted.

Therefore, avoidance of the waste of the wireless communication resource due to repetition of the re-sending of the TDLS Discovery Response frame becomes important.

Therefore, transmission of the TDLS Discovery Request frame including information that indicates the packet detection threshold has been changed, when the information processing device 100 transmits the TDLS Discovery Request frame, can be considered. A configuration example of a TDLS Discovery Request Action field to be transmitted in this case is illustrated in FIG. 14.

[Configuration Example of Frame]

FIGS. 12 and 13 are diagrams illustrating configurations of frames exchanged among the devices in the fourth embodiment of the present technology.

FIG. 12 illustrates a configuration example of the TDLS Discovery Request frame. FIG. 13 illustrates a configuration example of the TDLS Discovery Response frame.

FIG. 14 illustrates an example of a configuration example of the TDLS Discovery Request Action field exchanged among the devices in the fourth embodiment of the present technology. Note that the information illustrated in orders "1" to "4" is similar to the IEEE 802.11 specification of the related art.

As illustrated in FIG. 14, in the TDLS Discovery Request Action field, an information element (order "5") is added (the information in the dotted line square 601 illustrated in FIG. 12).

For example, a value currently reserved (222, for example) is set as an Element ID (1 byte). Further, 3 is set as Length (1 byte). Further, a packet detection threshold (1 byte) used in receiving the TDLS Discovery Response frame, a time length (1 byte) to wait for detection of the TDLS Discovery Response frame, and information ACK Control (1 byte) for ACK control are stored.

For example, as information stored in a field that specifies the packet detection threshold used in receiving the TDLS Discovery Response frame, a value that indicates reception signal power strength of an arrived packet can be used. For example, as the value that indicates reception signal power strength of an arrived packet, a value in the unit of dBm with an inverted sign, can be used. For example, 70 is set to the field in the decimal system, when providing notification that the packet is detected if the reception signal power strength of the arrived packet is −70 dBm or more, and the packet is not detected if the signal strength is less than −70 dBm.

Further, for example, as information stored in a field that specifies a time length to wait for detection of the TDLS Discovery Response frame, a value that indicates a time can be used. For example, a time to change the threshold for detecting the TDLS Discovery Response frame after transmission of the TDLS Discovery Request frame can be specified in the decimal system in the unit of msec.

Further, 0 or 1 is stored in an ACK control field. For example, when 1 is stored in the ACK control field, the information processing device that has received 1 uses Action No ACK frame in transmitting the TDLS Discovery Response frame.

Further, for example, when 0 is stored in the ACK control field, the information processing device that has received 0 does not use the Action No ACK frame transmitting the TDLS Discovery Response frame. That is, the information processing device uses normal Action frame in transmitting the TDLS Discovery Response frame. In this case, the information processing device re-sends the TDLS Discovery Response frame until receiving the ACK corresponding thereto, or until reaching the maximum number of times of the re-sending set in advance.

As described above, the information processing device 100 can transmits the TDLS Discovery Request frame including the information that specifies the packet detection threshold used in receiving the TDLS Discovery Response frame. Similarly, the information processing device 100 can transmit the TDLS Discovery Request frame including the information that specifies the time length to wait for detection of the TDLS Discovery Response frame.

When having received at least one of the aforementioned information, the information processing device 200 can recognize change of the packet detection threshold when the information processing device 100 waits for detection of the TDLS Discovery Response frame. Therefore, the information processing device 200 can recognize that there is a possibility that the ACK to the TDLS Discovery Response frame has not been detected due to the change of the packet detection threshold, even if the ACK is not returned from the information processing device 100. Accordingly, repetition of re-sending of the TDLS Discovery Response frame by the information processing device 200 due to no-return of the ACK can be prevented. Further, the information processing device 200 can transmit the TDLS Discovery Response frame, using the Action No ACK.

Further, the information processing device 200 can include, in the TDLS Discovery Request frame, information that specifies transmission of the TDLS Discovery Response frame, using the Action No ACK (491 and 493 illustrated in FIG. 11). In this case, for example, as illustrated by the dotted line square 602 of FIG. 13, the information processing device 200 transmits the TDLS Discovery Response frame, using the Action No ACK (496 illustrated in FIG. 11). Accordingly, the information processing device 200 can avoid re-sending of the TDLS Discovery Response frame due to no-return of the ACK from the information processing device 100. Note that the procedure of transmitting the TDLS Discovery Response frame (496 illustrated in FIG. 11) is an example of a control procedure of transmitting a device discovery response signal described in Claims.

Further, assume a case in which the information processing device 100 transmits the TDLS Discovery Request frame, including information that specifies the time length to wait for detection of the TDLS Discovery Response frame. In this case, the information processing device 200 re-sends the TDLS Discovery Response frame during a specified range if it is difficult to receive the ACK to the TDLS Discovery Response frame. Meanwhile, the information processing device 200 stops re-sending of the TDLS Discovery Response frame if it is difficult to receive the ACK from the information processing device 100 even after exceeding the specified range.

As described above, a control unit 150 of the information processing device 100 can transmit the device discovery request packet, including the information related to the reception power used in obtaining the packet detection threshold th2 (the value indicating the reception signal power strength of the arrived packet, for example). Further, the control unit 150 of the information processing device 100 can transmit the device discovery request packet, including the information related to the time band to wait for detection of the device discovery response packet. Further, the control unit 150 of the information processing device 100 can transmit the device discovery request packet, including the information that specifies use of the signal of not performing reception confirmation when the information processing device 200 transmits the device discovery response packet. Further, the control unit 150 of the information processing device 100 can transmit the device discovery request packet, including at least one of the aforementioned information.

Further, a control unit of the information processing device 200 transmits the device discovery response packet to the information processing device 100, based on the information, when at least one of the aforementioned information is included when having received the device discovery request packet form the information processing device 100.

As described above, an example in which the information processing device 100 transmits the TDLS Discovery Request frame, including the information regarding whether the ACK to the TDLS Discovery Response frame is expected, has been described. However, such information may be notified to the information processing device 200 by another method. For example, a predetermined rule (for example, it is necessary to use of the Action No ACK by the TDLS Discovery Response frame) is determined on a protocol of wireless communication, whereby transmission of the information can be omitted.

5. Fifth Embodiment

In a fifth embodiment of the present technology, an example of selecting and using a PHY preamble from a plurality of PHY preambles, in transmitting a device discovery response packet. Note that configurations of devices in the fifth embodiment of the present technology are approximately the same as those of the devices illustrated in FIGS. 1 and 2, and the like. Therefore, parts common to the first embodiment of the present technology are denoted with the same reference signs of the first embodiment of the present technology, and a part of description thereof is omitted.

For example, a configuration of a communication system that selects and uses a PHY preamble from a plurality of candidates according to wireless signal quality between devices can be considered. For example, in a communication system, when an information processing device 100 transmits a TDLS Discovery Request frame, the information processing device 100 can include and transmit information that specifies a PHY preamble according to an expected reception signal level in the TDLS Discovery Request frame. A configuration example of a TDLS Discovery Request Action field for including the information in the TDLS Discovery Request frame is illustrated in FIG. 15.

[Configuration Example of TDLS Discovery Request Action Field]

FIG. 15 is a diagram illustrating a configuration example of a TDLS Discovery Request Action field in the fifth embodiment of the present technology. Note that FIG. 15 is a modification of FIG. 14, and is different in that each information illustrated in order "5" is provided with Preamble pattern sub field.

The Preamble pattern sub field is a sub field for specifying a type of a PHY preamble to be added to the frame, in transmitting the TDLS Discovery Response frame. That is, an information processing device that has received the TDLS Discovery Request frame can specify the type of a PHY preamble to be added to the frame, in transmitting the TDLS Discovery Response frame.

As described above, the information processing device can specify the type of an expected PHY preamble in detecting and receiving the TDLS Discovery Response frame, using the Preamble pattern sub field.

For example, the information processing device 100 can specify the PHY preamble that can be detected with lowest reception power, of the plurality of PHY preambles used in the communication system.

As described above, a control unit 150 of the information processing device 100 can transmit the device discovery request packet, including the information that specifies the type of a PHY preamble to be used in the device discovery response packet. In this case, the control unit 150 can include the information that specifies the PHY preamble that can be received with the lowest reception power in direct wireless communication between the information processing device 100 and an information processing device 200.

Further, the control unit 150 of the information processing device 100 can transmit the device discovery request packet, including at least one of the information that specifies the type of a PHY preamble to be used in the device discovery response packet, and the information indicated in the fourth embodiment of the present technology. In this case, a control unit of the information processing device 200 transmits the device discovery response packet to the information processing device 100, based on the information, if at least one of the aforementioned information is included when having received the device discovery request packet from the information processing device 100. Here, assume a case in which information related to reception power used in obtaining a packet detection threshold th2 is included in the device discovery request packet, but the information that specifies the type of a PHY preamble to be used in the device discovery response packet is not included. In this case, the control unit of the information processing device 200 can transmit the device discovery response packet, using one of the plurality of PHY preambles that can be used in the wireless communication, based on the information related to the reception power used in obtaining the packet detection threshold th2.

Further, only an information processing device existing in a relatively short distance can be discovered, without discovering an information processing device existing in a long distance. In this case, a PHY preamble that can be detected only in a case of the highest reception power, of the plurality of PHY preambles used in the communication system.

As described above, the information processing device 100 can transmit the TDLS Discovery Request frame including the Preamble pattern sub field. Further, the information processing device 200 that has received the frame transmits the TDLS Discovery Response frame, adding the PHY preamble specified in the Preamble pattern sub field to the TDLS Discovery Response frame, in transmitting the frame.

In the above description, an example of specifying the PHY preamble, using the Preamble pattern sub field, has been described. However, the PHY preamble may be specified using another information.

For example, assume a case of a wireless communication system specification that can select and use one of the plurality of PHY preambles. In this case, the information processing device 100 transmits the TDLS Discovery Request frame, including information corresponding to the packet detection threshold to be used in receiving the TDLS Discovery Response frame.

An information processing device that has received the TDLS Discovery Request frame selects one PHY preamble that is presumably optimally detected with the packet detection threshold. Then, the information processing device configures the TDLS Discovery Response frame with the selected PHY preamble, and transmit the TDLS Discovery Response frame. That is, the information processing device that has received the TDLS Discovery Request frame can appropriately select the PHY preamble, even if information that specifies the PHY preamble is not included in the frame.

6. Sixth Embodiment

In a six embodiment of the present technology, an example of performing wireless communication, using device to device (D2D) defined in 3rd Generation Partnership Project (3GPP) is described.

[Configuration Example of Communication System]

Figure 16:
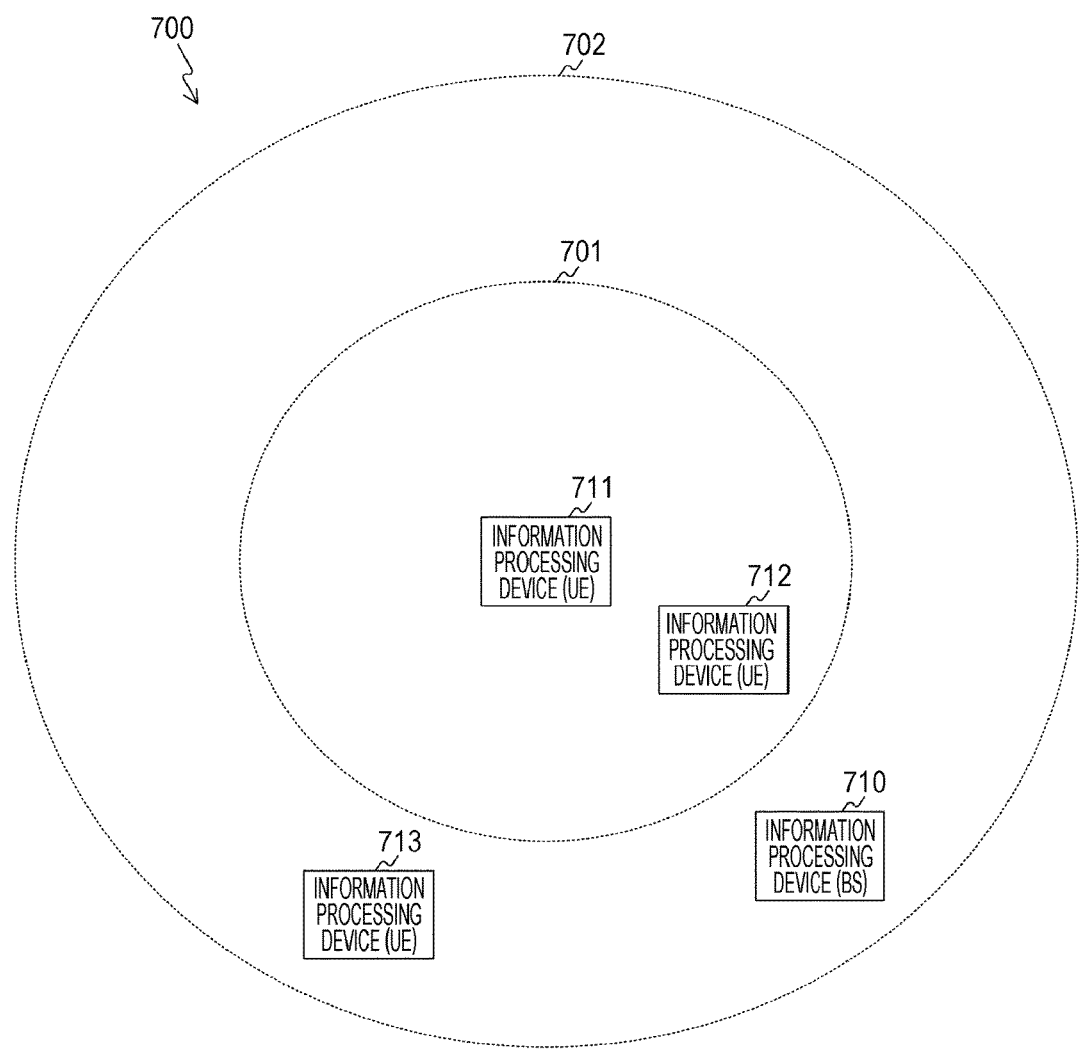
FIG. 16 is a diagram illustrating a system configuration example of a communication system 700 in a sixth embodiment of the present technology.

FIG. 16 is a diagram illustrating a system configuration example of a communication system 700 in a sixth embodiment of the present technology. FIG. 16 illustrates an example of a network configuration (system configuration) of a case of performing wireless communication, using D2D defined in 3GPP. In this network configuration, a wireless communication parent station is referred to as base station (BS), and an information processing device (moving body) is referred to as user equipment (UE).

The communication system 700 includes an information processing device (BS) 710, an information processing device (UE) 711, an information processing device (UE) 712, and an information processing device (UE) 713. Note that the information processing devices (UE) 711 to 713 are information processing devices corresponding to the information processing device 100 and the information processing device 200 described in FIG. 1. Further, the information processing device (BS) 710 is an information processing device corresponding to the access point 300 illustrated in FIG. 1.

[Example of Resource Allocation Map]

Figure 17:
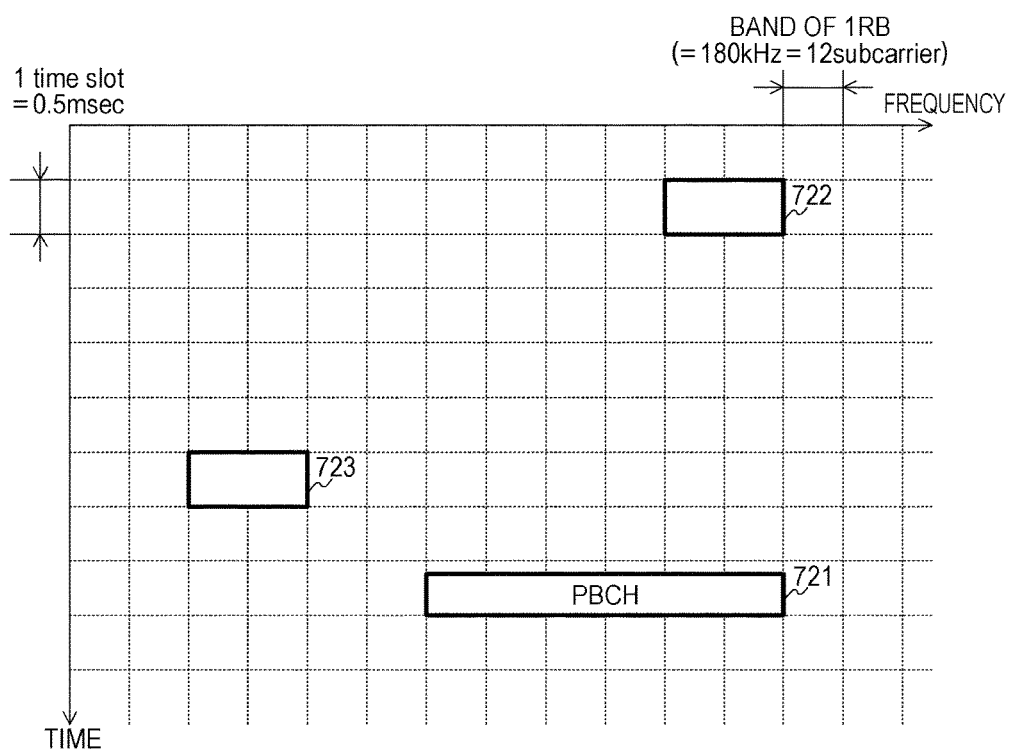
FIG. 17 is a diagram illustrating an example of a resource allocation map transmitted by an information processing device (BS) 710 in a sixth embodiment of the present technology.

FIG. 17 is a diagram illustrating an example of a resource allocation map transmitted by the information processing device (BS) 710 in the sixth embodiment of the present technology. The resource allocation map is information that indicates allocation of wireless communication resources in frequency-time. Note that, in FIG. 17, a part of the resource is simplified for ease of description.

Here, an operation of D2D Discovery will be described.

First, a case in which the information processing device (UE) 711 performs communication through the information processing device (BS) 710 will be described. For example, the information processing device (UE) 711 searches for the information processing device (BS) 710 after supply of power source.

Here, the information processing device (BS) 710 transmits a physical broadcast channel (PBCH) 721 arranged in a position defined in the system, of frequency-time.

The information processing device (UE) 711 receives a synchronization channel (SCH) first, and performs time synchronization with the information processing device (UE) 711. Then, the information processing device (UE) 711 receives the PBCH after the time synchronization.

Here, in the broadcast channel (BCH) transmitted in the PBCH includes the resource allocation map (or a part of the map) that indicates allocation of wireless communication resources in frequency-time.

Note that a case in which the entire resource allocation map is not included in the BCH exists. In this case, the information processing device (UE) 711 receives a downlink shared channel (DL-SCH) transmitted in a physical downlink shared channel (PDSCH) in which time/frequency positions are specified. Accordingly, the information processing device (UE) 711 can obtain a complete resource allocation map.

As described above, the information processing device (UE) 711 that has obtained the resource allocation map transmits a random access preamble in a random access channel (RACH) in which the time/frequency positions are specified. Then, the information processing device (BS) 710 that has received the random access preamble transmits a random access response in the DL-SCH.

Further, the information processing device (UE) 711 that has received the random access response transmits terminal identification information and the like in an uplink shared channel (UL-SCH). The information processing device (BS) 710 that has received the terminal identification information notifies the information processing device (UE) 711 that terminal identification has been completed, in the DL-SCH.

In this stage, the information processing device (UE) 711 becomes able to transmit/receive data to/from the information processing device (BS) 710.

Next, a case in which the information processing device (UE) 711 directly communicates with another information processing device (UE), using D2D communication without involving the information processing device (BS) 710, will be described.

First, the information processing device (UE) 711 transmits a D2D Discovery packet, in a resource allocation pool specified as D2D Discovery Type-1, of the resource allocation map illustrated in FIG. 17. FIG. 17 illustrates the D2D Discovery Type-1 by the thick line squares 722 and 723. Further, it is favorable to include an identifier of the own device and a resource block (RB) in the D2D Discovery packet. Here, the resource block (RB) is a resource block that is temporally after the timing when the own device transmits the D2D Discovery packet, and a response of which is expected by the own device, of the resource allocation pool specified as the D2D Discovery Type-1.

Further, when transmitting the D2D Discovery packet, the information processing device (UE) 711 may transmit the D2D Discovery packet with lower power than the case of transmitting the packet addressed to the information processing device (BS) 710, thereby to decrease interference to peripheral stations.

Further, the another information processing device (UE) that has received the D2D Discovery packet from the information processing device (UE) 711 transmits a response packet to the D2D Discovery Packet, in the RB specified in the D2D Discovery packet. It is favorable to include an identifier of an information processing device (UE) to respond and an identifier of the information processing device (UE) that has transmitted a responding D2D Discovery packet.

The information processing device (UE) 711 can set a packet detection threshold higher than a threshold in detecting a packet from the information processing device (BS), in the RB that waits for the response packet from the another information processing device (UE) to the D2D Discovery packet. Accordingly, detection of a response packet from an information processing device (UE) existing in the distance can be prevented. Therefore, the wireless communication resource necessary in performing direct communication with the information processing device (UE) that can be a discovered partner, using the D2D, can be minimized, and efficient wireless communication can be performed.

For example, in the example illustrated in FIG. 16, the information processing device (UE) 712 exists in a relatively close position to the information processing device (UE) 711, and the information processing device (UE) 713 exists in a relatively distant position from the information processing device (UE) 711. In such a case, the packet detection threshold of the information processing device (UE) 711 is increased, so that the position of the another information processing device (UE) that transmits a detectable packet can be limited to the packet detection range 701. Therefore, the information processing device (UE) 711 detects the response packet from the information processing device (UE) 712, but does not detect the response packet from the information processing device (UE) 713. Accordingly, the information processing device (UE) 711 can be prevented from receiving and detecting the response packet from the information processing device (UE) 713 before the response packet from the information processing device (UE) 712, and starting reception. That is, a possibility of failing to detect and receive the response packet from the information processing device (UE) 712 can be decreased.

Further, as described above, the information processing device (UE) 711 can decrease the transmission power when transmitting the D2D Discovery packet. In this case, it is favorable to set the packet detection threshold with which the response packet from a range corresponding to a position where detection and reception of the packet can be expected can be detected and received.

For example, in the example illustrated in FIG. 16, the information processing device (UE) 711 transmits the packet with transmission power, which may not be received at a position of the information processing device (UE) 713 existing in the distant. Accordingly, it is difficult that the information processing device (UE) 713 receives the D2D Discovery packet from the information processing device (UE) 711. Therefore, the response packet from the information processing device (UE) 713 does not occur, and thus interference provided to another communication can be decreased.

Further, the packet detection threshold can be set similarly to the first embodiment of the present technology. For example, when the D2D communication is actually performed after completion of D2D Discovery, the D2D communication can be performed while maintaining communication with the information processing device (BS), using min{th1, th2}, as the packet detection threshold.

Further, to decrease an influence of interference to another information processing device (UE), the information processing device (UE) 711 can set the packet detection threshold to th2 when performing the D2D communication with the information processing device (UE) 712. In this case, it is favorable that the information processing device (UE) 711 performs UE-BS communication with the information processing device (BS) 710 and notifies a time band in which it is difficult that the information processing device (UE) 711 receives the packet from the information processing device (BS) 710, to the information processing device (BS) 710 side. Accordingly, the information processing device (UE) 711 can cause the information processing device (BS) 710 side to accumulate data.

As described above, a control unit of the information processing device (UE) 711 can transmit the D2D Discovery packet in the first time and the frequency slot allocated to the direct wireless communication with the information processing device (UE) 712, based on wireless communication resource allocation information. Note that the wireless communication resource allocation information is the resource allocation map (illustrated in FIG. 17) notified from the information processing device (BS) 710. Further, the D2D Discovery packet is an example of the device discovery request signal. Further, the control unit of the information processing device (UE) 711 can wait for detection of the response packet (device discovery response signal) in a second time and a frequency slot arranged temporally after the first time and the frequency slot, of the wireless communication resource allocation information.

As described above, in the embodiment of the present technology, the packet detection threshold with which the discovery response packet to the discovery request packet is detected is changed, when a partner device that can perform direct inter-device communication without involving the wireless communication parent station is discovered. That is, a threshold, which is different from a threshold of while waiting for the packet from the wireless communication parent station, is used as the packet detection threshold while waiting for the device discovery response packet after transmission of the device discovery request packet for performing the direct inter-device communication. Accordingly, only a response packet from a partner device existing in the vicinity and which can be a partner device candidate suitable for the direct inter-device communication that consumes smaller wireless communication resource than a case of performing communication through the wireless communication parent station can be detected and received. Therefore, the consumption of the wireless communication resource can be decreased, and reduction in power consumption can be realized. That is, the wireless communication resource can be efficiently used.

Further, to perform setting not to detect an interference signal from a distant place, a probability of failure of reception of the response packet due to collision of the packets can be decreased. Therefore, the device discovery processing can be completed in a shorter time. Therefore, the consumption of the wireless communication resources can be further decreased. Further, detection and reception of an arrived packet that is less than the packet detection threshold are not performed. Therefore, the power consumption can be decreased.

Further, when the direct inter-device communication is actually started, use of the packet detection threshold that enables direct inter-device communication is controlled, in a state of maintaining reception/transmission of data with the wireless communication parent station. Therefore, latency and jitter in the transmission/reception of data with the wireless communication parent station can be decreased.

Further, when use of the packet detection threshold optimized for the direct inter-device communication is controlled, after the start of the actual direct inter-device communication, a period in which a packet from the wireless communication parent station is not detected can be notified to the wireless communication parent station in advance. Accordingly, although the latency and jitter in the reception/transmission of data with the wireless communication parent station is increased, discard of the packet in the wireless communication parent station can be avoided, and robust reception can be performed against interference from a peripheral information processing device. Further, at this time, the transmission power can be decreased so that the communication with a direct communication possible partner device can be performed, the direct communication possible partner existing in a range according to a receivable area, which is determined with the packet detection threshold. Accordingly, the interference given to another station can be decreased, throughput in the entire system can be improved, and the power consumption of the own station can be decreased.

7. Application Example

The technology according to an embodiment of the present disclosure can be applied to various products. For example, the information processing devices 100, 200, and 210, and the information processing devices (UE) 711 to 713 may be realized as a mobile terminal such as a smart phone, a tablet personal computer (PC), a note PC, a mobile game terminal, or a digital camera, a fixed terminal such as a television receiver, a printer, a digital scanner, or a network storage, or an onboard terminal such as a car navigation device. Further, the information processing devices 100, 200, and 210, and the information processing devices (UE) 711 to 713 may be realized as a terminal that performs machine to machine (M2M) communication (also referred to as machine type communication (MTC) terminal) such as a smart meter, a vending machine, a remote monitoring device, or a point of sale (POS) terminal. Further, the information processing devices 100, 200, and 210, and the information processing devices (UE) 711 to 713 may be a wireless communication module mounted on the aforementioned terminals (an integrated circuit module configured from one die, for example).

Meanwhile, for example, the access points 300 and 310, and the information processing device (BS) 710 may be realized as a wireless LAN access point (also referred to as wireless base station) with/without a router function. Further, the access points 300 and 310, and the information processing device (BS) 710 may be realized as a mobile wireless LAN router. Further, the access points 300 and 310, and the information processing device (BS) 710 may be a wireless communication module mounted on the aforementioned devices (an integrated circuit module configured from one die, for example).

7-1. First Application Example

Figure 18:
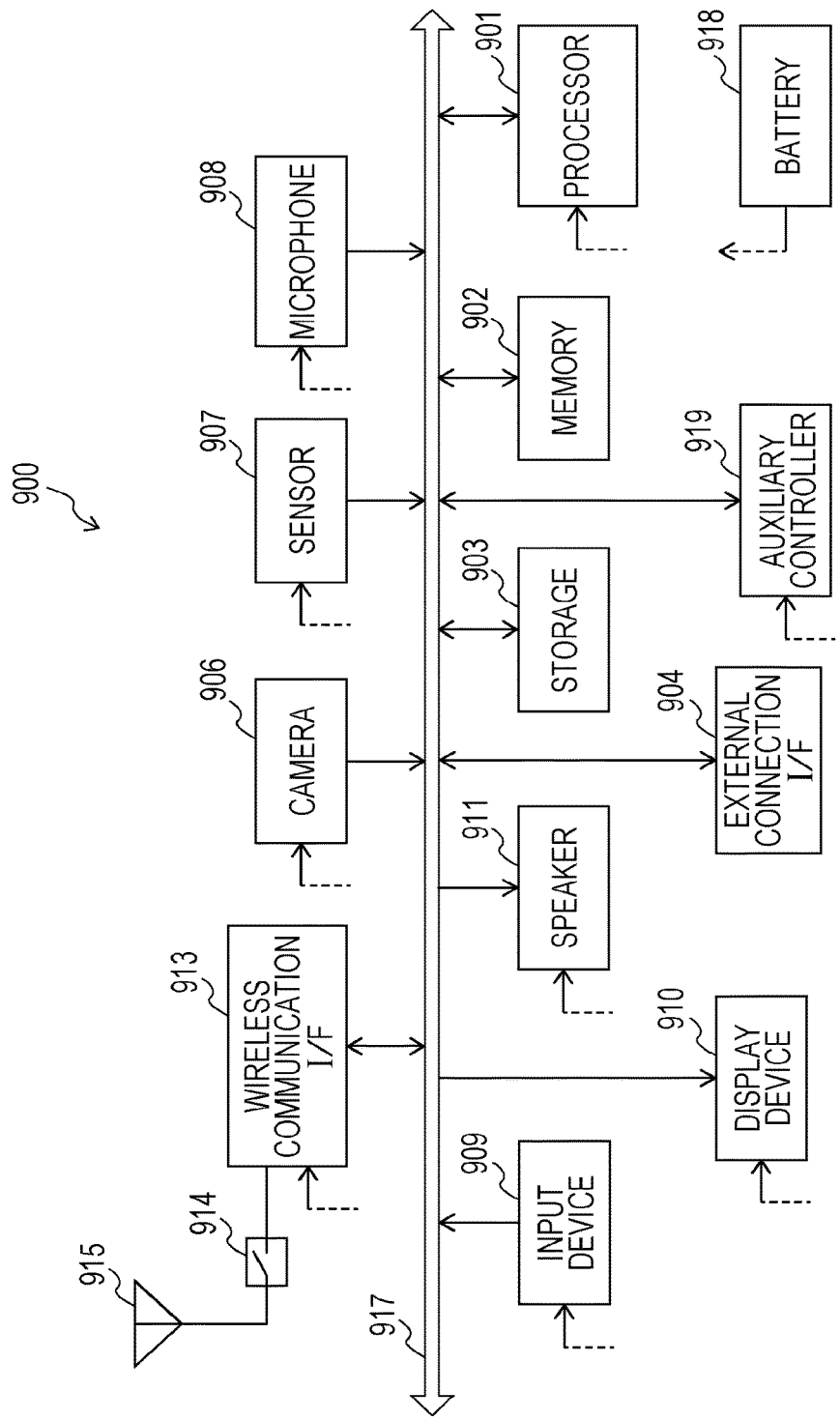
FIG. 18 is a block diagram illustrating an example of a schematic configuration of a smart phone.

FIG. 18 is a block diagram illustrating an example of a schematic configuration of a smart phone 900 to which the technology according to an embodiment of the present disclosure can be applied. The smart phone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be a central processing unit (CPU) or a system on chip (SoC), and controls functions of an application layer and other layers of the smart phone 900. The memory 902 includes random access memory (RAM) and read only memory (ROM), and stores a program executed by the processor 901 and data. The storage 903 can include a storage medium such as a semiconductor memory or a hard disk. The external connection interface 904 is an interface for connecting an external device such as a memory card or a universal serial bus (USB) device to the smart phone 900.

The camera 906 includes an imaging element such as a charge coupled device (CCD) or a complementary metal oxide semiconductor (CMOS), and generates an imaged image. The sensor 907 can include a sensor group of a positioning sensor, a gyro sensor, a magnetic field sensor, an acceleration sensor, and the like. The microphone 908 converts a sound input to the smart phone 900 into a sound signal. The input device 909 includes a touch sensor that detects touch on a screen of the display device 910, a keypad, a keyboard, a button, a switch, or the like and receives an operation from a user or an input of information. The display device 910 includes a liquid crystal display (LCD), an organic light emitting diode (OLED) display, or the like, and displays an output image of the smart phone 900. The speaker 911 converts a sound signal output from the smart phone 900 into a sound.

The wireless communication interface 913 supports one or more wireless LAN standards such as IEEE 802.11a, 11b, 11g, 11n, 11ac, and 11ad, and executes the wireless communication. The wireless communication interface 913 can perform communication with another device through a wireless LAN access point in an infrastructure mode. Further, the wireless communication interface 913 can perform direct communication with another device in an ad-hoc mode or a direct communication mode such as Wi-Fi Direct. In the Wi-Fi Direct, one of two terminals works as an access point, which is different from the ad-hoc mode. However, the communication is directly performed between the two terminals. The wireless communication interface 913 can typically include a base band processor, a radio frequency (RF) circuit, a power amplifier, and the like. The wireless communication interface 913 may be a one-chip module in which a memory that stores a communication control program, a processor that executes the program, and a related circuit are integrated. The wireless communication interface 913 may support another type of wireless communication system such as a short distance wireless communication system, a proximity wireless communication system, or a cellular communication system, in addition to the wireless LAN system. The antenna switch 914 switches a connection destination of the antenna 915 among a plurality of circuits (circuits for different wireless communication systems, for example) included in the wireless communication interface 913. The antenna 915 includes a single or a plurality of antenna elements (a plurality of antenna elements that configures a MIMO antenna, for example), and is used for wireless signal transmission/reception by the wireless communication interface 913.

Note that the configuration is not limited to the example of FIG. 18, and the smart phone 900 may include a plurality of antennas (wireless LAN antennas or antennas in the proximity wireless communication system, for example). In this case, the antenna switch 914 may be omitted from the configuration of the smart phone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to one another. The battery 918 supplies power to blocks of the smart phone 900 illustrated in FIG. 18 through a power feed line partially illustrated by the broken lines in the drawing. The auxiliary controller 919 operates minimum functions of the smart phone 900 in a sleep mode, for example.

In the smart phone 900 illustrated in FIG. 18, the control unit 150 described with reference to FIG. 2 may be implemented in the wireless communication interface 913. Further, at least a part of the functions may be implemented in the processor 901 or the auxiliary controller 919.

Note that the smart phone 900 may be operated as a wireless access point (software AP) by execution of an access point function by the processor 901 in an application level. Further, the wireless communication interface 913 may include a wireless access point function.

7-2. Second Application Example

Figure 19:
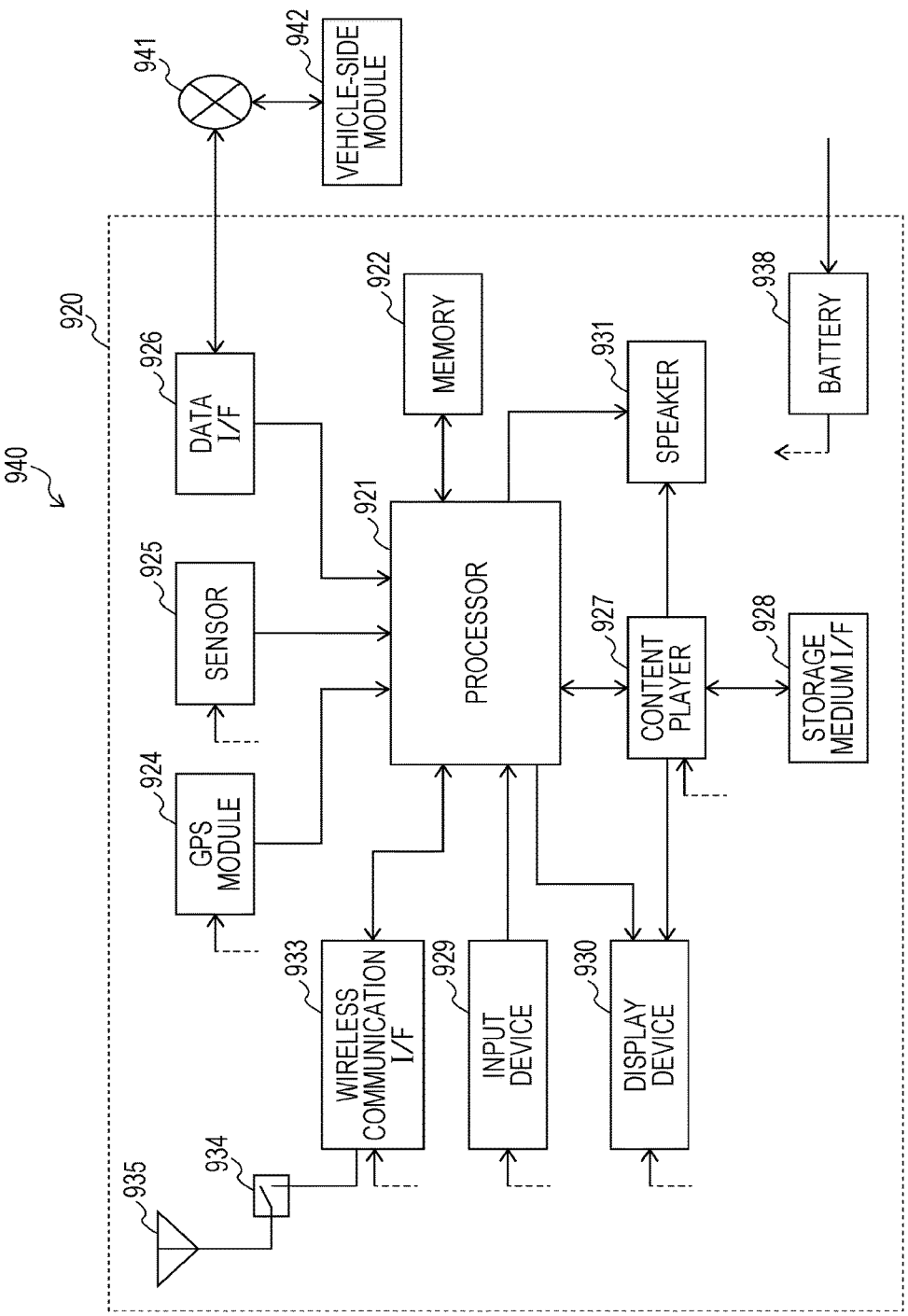
FIG. 19 is a block diagram illustrating an example of a schematic configuration of a car navigation device.

FIG. 19 is a block diagram illustrating an example of a schematic configuration of a car navigation device 920 to which the technology according to an embodiment of the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be a CPU or a SoC, and controls a navigation function and other functions of the car navigation device 920. The memory 922 includes RAM and ROM, and stores a program executed by the processor 921 and data.

The GPS module 924 measures a position (latitude, longitude, and altitude, for example) of the car navigation device 920, using a GPS signal received from a GPS satellite. The sensor 925 can include a sensor group of a gyro sensor, a magnetic field sensor, a pressure sensor, and the like. The data interface 926 is connected with the onboard network 941 through a terminal (not illustrated), and obtains data such as vehicle speed data generated on a vehicle side.

The content player 927 plays back content stored in a storage medium (a CD or a DVD, for example) inserted into the storage medium interface 928. The input device 929 includes a touch sensor that detects touch on a screen of the display device 930, a button, a switch, or the like, and receives an operation from the user or an input of information. The display device 930 includes a screen such as an LCD or an OLED display, and displays an image of the navigation function or the played back content. The speaker 931 outputs a sound of the navigation function or the played back content.

The wireless communication interface 933 supports one or more of the wireless LAN standards such as IEEE 802.11a, 11b, 11g, 11n, 11ac, and 11ad, and executes the wireless communication. The wireless communication interface 933 can perform communication with another device through a wireless LAN access point in an infrastructure mode. Further, the wireless communication interface 933 can perform direct communication with another device in an ad-hoc mode or a direct communication mode such as Wi-Fi Direct. The wireless communication interface 933 can typically include a base band processor, an RF circuit, a power amplifier, and the like. The wireless communication interface 933 may be a one-chip module in which a memory that stores a communication control program, a processor that executes the program, and a related circuit are integrated. The wireless communication interface 933 may support another type of wireless communication system such as a short distance wireless communication system, a proximity wireless communication system, or a cellular communication system, in addition to the wireless LAN system. The antenna switch 934 switches a connection destination of the antenna 935 among a plurality of circuits included in the wireless communication interface 933. The antenna 935 includes a single or a plurality of antenna elements, and is used for wireless signal transmission/reception by the wireless communication interface 933.

Note that the configuration is not limited to the example of FIG. 19, and the car navigation device 920 may include a plurality of antennas. In that case, the antenna switch 934 may be omitted from the configuration of the car navigation device 920.

The battery 938 supplies power to the blocks of the car navigation device 920 illustrated in FIG. 19 through a power feed line partially illustrated by the broken lines in the drawing. Further, the battery 938 accumulates power supplied from the vehicle side.

The control unit 150 described with reference to FIG. 2 may be implemented in the wireless communication interface 933 in the car navigation device 920 illustrated in FIG. 19. Further, at least a part of the functions may be implemented in the processor 921.

Further, the wireless communication interface 933 may be operated as the access points 300 and 310, and the information processing device (BS) 710, and may provide wireless connection to a terminal held by a user who is on a vehicle.

Further, the technology according to an embodiment of the present disclosure may be realized as an onboard system (or a vehicle) 940 that includes one or more blocks of the car navigation device 920, the onboard network 941, and the vehicle-side module 942. The vehicle-side module 942 generates vehicle-side data such as a vehicle speed, an engine speed, and failure information, and outputs the generated data to the onboard network 941.

7-3. Third Application Example

Figure 20:
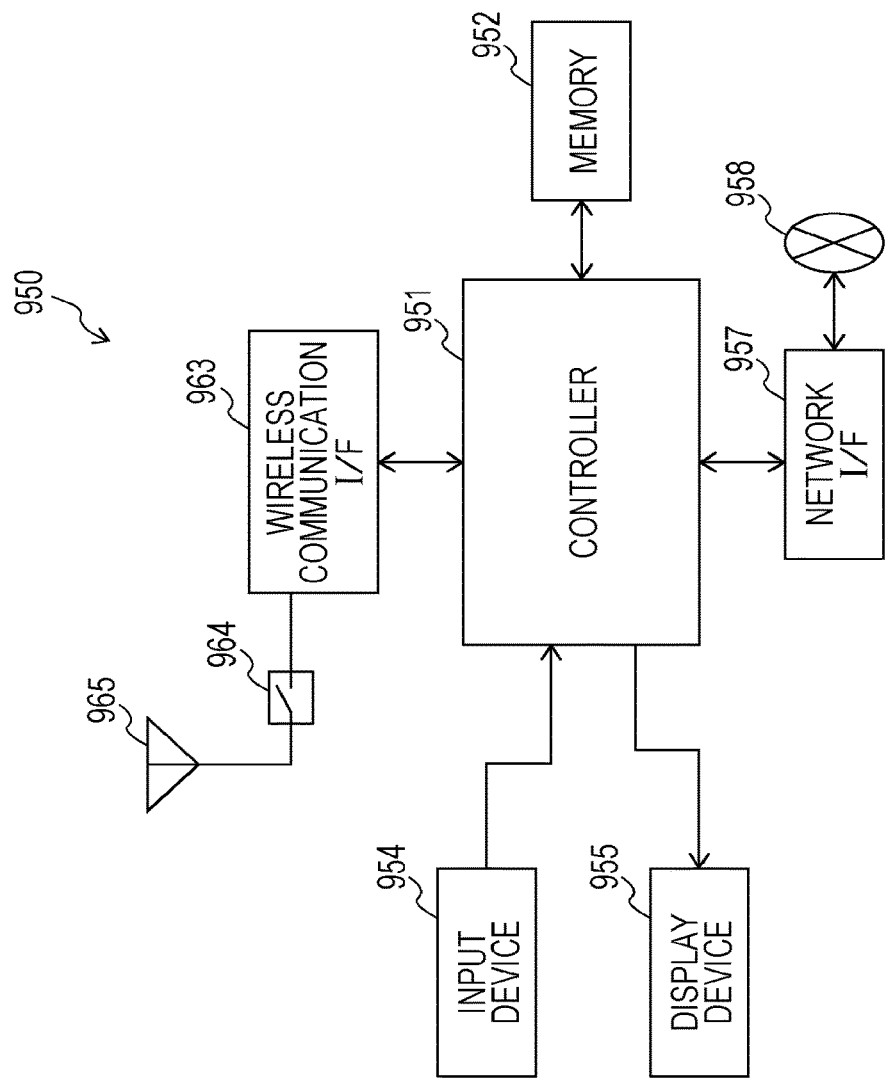
FIG. 20 is a block diagram illustrating an example of a schematic configuration of a wireless access point.

FIG. 20 is a block diagram illustrating an example of a schematic configuration of a wireless access point 950 to which the technology according to an embodiment of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be a CPU or a digital signal processor (DSP), and operates various functions (access limitation, routing, encryption, firewall, log management, and the like) of an upper layer than an internet protocol (IP) layer of the wireless access point 950. The memory 952 includes a RAM and a ROM, and stores a program executed by the controller 951, and various control data (a terminal list, a routing table, an encryption key, security setting, a log, and the like).

The input device 954 includes a button, a switch, and the like, and receives an operation from the user. The display device 955 includes an LED lamp, and displays an operation status of the wireless access point 950.

The network interface 957 is a wired communication interface for connecting the wireless access point 950 to the wired communication network 958. The network interface 957 may include a plurality of connection terminals. The wired communication network 958 may be a LAN such as Ethernet (registered trademark), or may be a wide area network (WAN).

The wireless communication interface 963 supports one or more of the wireless LAN standards such as IEEE 802.11a, 11b, 11g, 11n, 11ac, and 11ad, and provides wireless connection to a near terminal as an access point. The wireless communication interface 963 can typically include a base band processor, an RF circuit, a power amplifier, and the like. The wireless communication interface 963 may be a one-chip module in which a memory that stores a communication control program, a processor that executes the program, and a related circuit are integrated. The antenna switch 964 switches a connection destination of the antenna 965 among a plurality of circuits included in the wireless communication interface 963. The antenna 965 includes a single or a plurality of antenna elements, and is used for wireless signal transmission/reception by the wireless communication interface 963.

The control unit 150 described with reference to FIG. 2 may be implemented in the wireless communication interface 963 in the wireless access point 950 illustrated in FIG. 20. Further, at least a part of the functions may be implemented in the controller 951.

Note that the above-described embodiments are examples that embody the present technology, and the matters in the embodiments and the matters used to specify the invention have correspondence. Similarly, the matters used to specify the invention and the matters denoted with the same names in the embodiments of the present technology have correspondence. However, the present technology is not limited to the embodiments, and can be embodied by application of various modifications to the embodiments without departing from the gist of the present technology.

Further, the processing procedure described in the above embodiments may be regarded as a method having the series of procedures, or may be regarded as a program for causing a computer to execute the series of procedures, or a recording medium that stores the program. As the recording medium, a compact disc (CD), a mini disc (MD), a digital versatile disc (DVD), a memory card, a Blu-ray (registered trademark) disk, or the like can be used, for example.

Note that the effects described in the present specification are examples and are not limited, and other effects may be exhibited.

Note that the present technology can have configurations below.

(1)

An information processing device comprising:
a communication unit configured to transmit a device discovery request signal for performing direct inter-device wireless communication; and
a control unit configured to change a detection threshold for detecting a wireless communication signal at timing after transmission of the device discovery request signal.

(2)

The information processing device according to (1), wherein
the control unit sets a first threshold, as the detection threshold, when the control unit waits for detection of the wireless communication signal transmitted from a first information processing device connected when wireless communication is indirectly performed between the information processing device and another information processing device, and sets a second threshold different from the first threshold at timing after transmission of the device discovery request signal for discovering a second information processing device capable of performing direct wireless communication with the information processing device.

(3)

The information processing device according to (2), wherein
the control unit waits for detection of a device discovery response signal transmitted from the second information processing device for a predetermined time after the control unit sets the second threshold, and sets the first threshold after an elapse of the predetermined time.

(4)

The information processing device according to any of (1) to (3), wherein
the control unit uses an Institute of Electrical and Electronic Engineers (IEEE) 802.11 specification, as a protocol of the wireless communication, and uses tunneled direct link setup (TDLS), as a protocol that performs the direct wireless communication with the second information processing device,
the device discovery request signal is a TDLS Discovery Request frame, and
the device discovery response signal is a TDLS Discovery Response frame.

(5)

The information processing device according to (2) or (3), wherein
the control unit sets the second threshold obtained based on reception power of a case where the wireless communication using a data rate usable in the wireless communication between the information processing device and the first information processing device, or a data rate obtained based on the data rate is performed.

(6)
The information processing device according to any of (2), (3), and (5), wherein
the control unit notifies the first information processing device that the information processing device does not receive the wireless communication signal, while the second threshold is being set, when the control unit has set a value larger than the first threshold, as the second threshold.

(7)
The information processing device according to any of (2), (3), (5), and (6), wherein
the control unit sets a smaller value of the first threshold and the second threshold, as the detection threshold, while a direct wireless communication link is being established between the information processing device and the second information device, after reception of the device discovery response signal from the second information processing device, and sets the first threshold, as the detection threshold, at timing of cutting of the direct wireless communication link between the information processing device and the second information processing device.

(8)
The information processing device according to (7), wherein
the control unit performs transmission power control for performing transmission to the second information processing device within a range in which communication quality between the information processing device and the second information processing device is maintainable, and performs transmission power control for performing transmission to the first information processing device within a range in which communication quality between the information processing device and the first information processing device is maintainable, when the control unit has set a smaller value of the first threshold and the second threshold, as the detection threshold, while the direct wireless communication link is being established between the information processing device and the second information processing device.

(9)
The information processing device according to any of (2), (3), and (5) to (8), wherein
the control unit transmits the device discovery request signal, including, in the device discovery request signal, at least one of information related to reception power used when the control unit obtains the second threshold, information that specifies a type of a physical layer (PHY) preamble to be used in the device discovery response signal, information related to a time band to wait for detection of the device discovery response signal after transmission of the device discovery request signal, and information that specifies use of a signal of not performing reception confirmation when the second information processing device transmits the device discovery response signal.

(10)
The information processing device according to (9), wherein
the control unit includes information that specifies a PHY preamble receivable with lowest reception power in the direct wireless communication between the information processing device and the second information processing device, when the control unit transmits the device discovery request signal, including the information that specifies a type of a PHY preamble.

(11)
The information processing device according to any of (1) to (3) and (5) to (10), wherein
the control unit transmits the device discovery request signal in a first time and a frequency slot allocated to direct wireless communication with a second information processing device, based on wireless communication resource allocation information notified from a first information processing device, and waits for detection of a device discovery response signal in a second time and a frequency slot arranged temporally after the first time and the frequency slot, of the wireless communication resource allocation information.

(12)
The information processing device according to any of (1) to (11), wherein
the information processing device is an information processing device capable of performing the direct wireless communication with a second information processing device, in a state of maintaining wireless communication with a first information processing device.

(13)
An information processing device comprising:
a control unit configured to transmit, when the control unit has received a device discovery request signal for performing direct inter-device wireless communication from another information processing device, and when at least one of information below is included in the device discovery request signal, the control unit configured to transmit a device discovery response signal to the another information processing device, based on the information included in the device discovery request signal, the information being information related to reception power used when the control unit obtains a detection threshold to be used when the another information processing device detects the device discovery response signal, information that specifies a type of a PHY preamble to be used in the device discovery response signal, information related to a time band to wait for detection of the device discovery response signal after the information processing device transmits the device discovery request signal, and information that specifies use of a signal of not performing reception confirmation when the another information processing device transmits the device discovery response signal.

(14)
The information processing device according to (13), wherein
the control unit uses an IEEE 802.11 specification, as a protocol of the wireless communication, and uses TDLS, as a protocol that performs the direct wireless communication with the another information processing device,
the device discovery request signal is a TDLS Discovery Request frame, and
the device discovery response signal is a TDLS Discovery Response frame.

(15)
The information processing device according to (13) or (14), wherein,
when the device discovery request signal includes the information related to reception power used when the control unit obtains a detection threshold to be used when the another information processing device detects the device discovery response signal, but does not include the information that specifies a type of a PHY preamble to be used in the device discovery response signal, the control unit transmits the device discovery response signal, using one of a plurality of PHY preambles usable in the wireless communication, based on the information related to reception power used when the control unit obtains a detection threshold to be used when the another information processing device detects the device discovery response signal.

(16)

A communication system comprising:

a first information processing device including a control unit configured to set a first threshold, as a detection threshold for detecting a wireless communication signal, when the control unit waits for detection of the wireless communication signal transmitted from an access point connected when wireless communication is indirectly performed between the first information processing device and another information processing device, to set a second threshold different from the first threshold, as the detection threshold, at timing after transmission of a device discovery request signal for discovering a second information processing device capable of performing direct wireless communication with the first information processing device, and to transmit the device discovery request signal, including, in the device discovery request signal, at least one of information related to reception power used when the control unit obtains the second threshold, information that specifies a type of a PHY preamble to be used in a device discovery response signal corresponding to the device discovery request signal, information related to a time band to wait for detection of the device discovery response signal after transmission of the device discovery request signal, and information that specifies use of a signal of not performing reception confirmation when the second information processing device transmits the device discovery response signal; and a second information processing device including a control unit configured to transmit the device discovery response signal to the first information processing device, based on the information included in the device discovery request signal, when the second information processing device has received the device discovery request signal from the first information processing device.

(17)

An information processing method comprising:

changing a detection threshold for detecting a wireless communication signal at timing after transmitting a device discovery request signal for performing direct inter-device wireless communication.

(18)

An information processing method comprising:

when having received a device discovery request signal for performing direct inter-device wireless communication from another information processing device, and when at least one of information below is included in the device discovery request signal, the method including:

transmitting a device discovery response signal to the another information processing device, based on the information included in the device discovery request signal, the information being information related to reception power used when the control unit obtains a detection threshold to be used when the another information processing device detects the device discovery response signal, information that specifies a type of a PHY preamble to be used in the device discovery response signal, information related to a time band to wait for detection of the device discovery response signal after the information processing device transmits the device discovery request signal, and information that specifies use of a signal of not performing reception confirmation when the another information processing device transmits the device discovery response signal.

(19)

A program for causing a computer to execute a control procedure of:

changing a detection threshold for detecting a wireless communication signal at timing after transmitting a device discovery request signal for performing direct inter-device wireless communication.

(20)

A program for causing a computer to execute a control procedure of:

when having received a device discovery request signal for performing direct inter-device wireless communication from another information processing device, and when at least one of information below is included in the device discovery request signal, the control procedure of: transmitting a device discovery response signal to the another information processing device, based on the information included in the device discovery request signal, the information being information related to reception power used when the control unit obtains a detection threshold to be used when the another information processing device detects the device discovery response signal, information that specifies a type of a PHY preamble to be used in the device discovery response signal, information related to a time band to wait for detection of the device discovery response signal after the information processing device transmits the device discovery request signal, and information that specifies use of a signal of not performing reception confirmation when the another information processing device transmits the device discovery response signal.

REFERENCE SIGNS LIST 10 and 30 Communication system
100, 200, and 210 Information processing device
110 Data processing unit
120 Transmission processing unit
130 Modulation/demodulation unit
140 Wireless interface unit
141 Antenna
150 Control unit
160 Memory
300 and 310 Access point
700 Communication system
710 Information processing device (BS)
711 to 713 Information processing device (UE)
900 Smart phone
901 Processor
902 Memory
903 Storage
904 External connection interface
906 Camera
907 Sensor
908 Microphone
909 Input device
910 Display device
911 Speaker
913 Wireless communication interface
914 Antenna switch
915 Antenna
917 Bus 918 Battery
919 Auxiliary controller
920 Car navigation device
921 Processor
922 Memory
924 GPS module
925 Sensor
926 Data interface
927 Content player
928 Storage medium interface
929 Input device
930 Display device
931 Speaker
933 Wireless communication interface
934 Antenna switch
935 Antenna
938 Battery
941 Onboard network
942 Vehicle-side module
950 Wireless access point
951 Controller
952 Memory
954 Input device
955 Display device
957 Network interface
958 Wired communication network
963 Wireless communication interface
964 Antenna switch
965 Antenna

The invention claimed is:

1. An information processing device, comprising:
processing circuitry configured to
transmit a device discovery request signal for performing direct wireless communication;
change a detection threshold for detecting a wireless communication signal at a timing after transmission of the device discovery request signal;
set a first threshold, as the detection threshold, when waiting for detection of the wireless communication signal transmitted from a first information processing device connected when wireless communication is indirectly performed between the information processing device and another information processing device; and
set a second threshold different from the first threshold at the timing after transmission of the device discovery request signal for discovering a second information processing device capable of performing direct wireless communication with the information processing device, wherein
the device discovery request signal includes at least one of information related to a reception power used when the processing circuitry obtains the second threshold, information that specifies a type of a physical layer (PHY) preamble to be used in a device discovery response signal, information related to a time band to wait for detection of the device discovery response signal after the transmission of the device discovery request signal, and information that specifies use of a signal of not performing reception confirmation when the second information processing device transmits the device discovery response signal.

2. The information processing device according to claim 1, wherein the processing circuitry waits for detection of the device discovery response signal transmitted from the second information processing device for a predetermined time after the processing circuitry sets the second threshold, and sets the first threshold after an elapse of the predetermined time.

3. The information processing device according to claim 1, wherein
the processing circuitry uses tunneled direct link setup (TDLS) as a protocol for performing the direct wireless communication with the second information processing device,
the device discovery request signal is a TDLS Discovery Request frame, and
the device discovery response signal is a TDLS Discovery Response frame.

4. The information processing device according to claim 1, wherein the processing circuitry sets the second threshold based on the reception power of a case where the wireless communication is of a data rate usable in the wireless communication between the information processing device and the first information processing device.

5. The information processing device according to claim 1, wherein the processing circuitry notifies the first information processing device that the information processing device does not receive the wireless communication signal while the second threshold is being set and when the processing circuitry has set the second threshold as a value larger than the first threshold.

6. The information processing device according to claim 1, wherein
the processing circuitry sets the detection threshold as a smaller value of the first threshold and the second threshold, while a direct wireless communication link is being established between the information processing device and the second information device, after reception of the device discovery response signal from the second information processing device, and
the processing circuitry sets the first threshold as the detection threshold at a timing of cutting of the direct wireless communication link between the information processing device and the second information processing device.

7. The information processing device according to claim 6, wherein the processing circuitry performs a first transmission power control for performing transmission to the second information processing device within a range in which communication quality between the information processing device and the second information processing device is maintainable, and performs a second transmission power control for performing transmission to the first information processing device within a range in which communication quality between the information processing device and the first information processing device is maintainable, when the processing circuitry has set the detection threshold as a smaller value of the first threshold and the second threshold, while the direct wireless communication link is being established between the information processing device and the second information processing device.

8. The information processing device according to claim 1, wherein the processing circuitry includes the information that specifies the PHY preamble that is receivable with a lowest reception power in the direct wireless communication between the information processing device and the second information processing device, when the processing circuitry transmits the device discovery request signal including the information that specifies a type of the PHY preamble.

9. The information processing device according to claim 1, wherein the processing circuit transmits the device discovery request signal in a first time and a frequency slot allocated to direct wireless communication with the second information processing device, based on wireless communication resource allocation information notified from the first information processing device, and waits for detection of the device discovery response signal in a second time and a frequency slot arranged temporally after the first time and the frequency slot, of the wireless communication resource allocation information.

10. The information processing device according to claim 1, wherein the processing circuitry is capable of performing the direct wireless communication with the second information processing device while maintaining wireless communication with the first information processing device.

11. An information processing device comprising:
processing circuitry configured to transmit, when the information processing device has received a device discovery request signal for performing direct wireless communication from another information processing device, a device discovery response signal to the another information processing device based on information included in the device discovery request signal, wherein
the information includes at least one of the following:
first information related to a reception power used for transmission of the device discovery response signal when the processing circuitry obtains a detection threshold to be used when the another information processing device detects the device discovery response signal,
second information specifies a type of a physical layer (PHY) preamble to be used in the device discovery response signal,
third information related to a time band for the another information processing device to wait for detection of the device discovery response signal after the information processing device transmits the device discovery request signal, and
fourth information specifies use of a signal of not performing reception confirmation when the another information processing device transmits the device discovery request signal.

12. The information processing device according to claim 11, wherein
the processing circuitry uses tunneled direct link setup (TDLS) as a protocol for performing the direct wireless communication with the another information processing device,
the device discovery request signal is a TDLS Discovery Request frame, and
the device discovery response signal is a TDLS Discovery Response frame.

13. The information processing device according to claim 11, wherein, when the device discovery request signal includes the first information but does not include the second information, the processing circuitry transmits the device discovery response signal using one of a plurality of PHY preambles usable in the wireless communication based on the first information.

* * * * *